US00RE39023E

(19) United States
(12) Reissued Patent
Sasaki

(10) Patent Number: US RE39,023 E
(45) Date of Reissued Patent: Mar. 21, 2006

(54) POWER OUTPUT APPARATUS AND METHOD OF CONTROLLING THE SAME

(75) Inventor: Shoichi Sasaki, Shizuoka-ken (JP)

(73) Assignee: Toyota Jidosha Kabushiki Kaisha, Toyota (JP)

(21) Appl. No.: 09/885,676

(22) Filed: Jun. 21, 2001

Related U.S. Patent Documents

Reissue of:
(64) Patent No.: 5,914,575
Issued: Jun. 22, 1999
Appl. No.: 08/855,116
Filed: May 13, 1997

(30) Foreign Application Priority Data

Sep. 13, 1996 (JP) ..... 8-265187

(51) Int. Cl.
*H02P 5/20* (2006.01)
*H02P 5/22* (2006.01)
*H02P 7/14* (2006.01)
*H02P 7/32* (2006.01)
*H02P 7/34* (2006.01)

(52) U.S. Cl. ..... 318/140; 318/757; 318/362; 477/3; 477/7; 180/65.2; 180/65.6

(58) Field of Classification Search ..... 318/757, 318/812, 362, 140–150; 310/266, 112, 114, 310/103; 475/3, 5, 149; 322/11, 13, 40; 477/2–9; 180/65.2, 65.3, 65.6; 290/15–16, 19–23
See application file for complete search history.

(56) References Cited

U.S. PATENT DOCUMENTS 3,620,323 A * 11/1971 Maeda et al. ..... 180/65.2
3,623,568 A * 11/1971 Mori ..... 180/15
5,285,111 A * 2/1994 Sherman ..... 290/4 C
5,287,772 A * 2/1994 Aoki et al. ..... 318/139
5,492,189 A * 2/1996 Kriegler et al. ..... 180/65.2
5,508,574 A * 4/1996 Vlock ..... 310/113
5,513,719 A * 5/1996 Moroto et al. ..... 180/65.4
5,558,588 A * 9/1996 Schmidt ..... 180/65.2
5,558,589 A * 9/1996 Schmidt ..... 475/5
5,558,595 A * 9/1996 Schmidt et al. ..... 477/3
5,637,987 A * 6/1997 Fattic et al. ..... 322/40
5,713,814 A * 2/1998 Hara et al. ..... 477/5
5,730,676 A * 3/1998 Schmidt ..... 475/5
5,744,895 A * 4/1998 Seguchi et al. ..... 310/266
5,791,427 A 8/1998 Yamaguchi
6,543,588 B1 * 4/2003 Raad ..... 318/139

FOREIGN PATENT DOCUMENTS

| | | |
|---|---|---|
| AU | 58401/73 | 1/1975 |
| DE | 41 24 479 A1 | 1/1993 |
| EP | 0 725 474 A1 | 8/1996 |
| EP | 0 775 607 A1 | 5/1997 |
| EP | 0 798 844 A1 | 10/1997 |
| JP | A-4-322105 | 11/1992 |
| WO | WO 89/04081 | 5/1989 |

* cited by examiner

*Primary Examiner*—Marlon T. Fletcher
(74) *Attorney, Agent, or Firm*—Oliff & Berridge, PLC

(57) ABSTRACT

While a ring gear shaft 126 linked with a drive shaft rotates, a power output apparatus 110 applies a torque to a first motor MG1 attached to a sun gear shaft 125, thereby abruptly increasing a revolving speed of an engine 150, to which a fuel injection is stopped. A torque generated by a frictional force of, for example, a piston in the engine 150 and working as a reaction is applied as a braking torque to the ring gear shaft 126 via a planetary gear 120. The magnitude of the braking torque depends upon the frictional force of, for example, the piston and can be controlled by regulating the revolving speed of the engine 150 by means of the first motor MG1. This control procedure enables the energy consumed by the engine 150 to be output as a braking force to the drive shaft.

11 Claims, 28 Drawing Sheets

POWER OUTPUT APPARATUS AND METHOD OF CONTROLLING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a power output apparatus and a method of controlling the same. More specifically the present invention pertains to a power output apparatus for outputting power to a drive shaft and a method of controlling such a power output apparatus.

2. Description of the Prior Art

Proposed power output apparatus include an internal combustion engine, a planetary gear as three shaft-type power input/output means, two motors (a first motor and a second motor) that can input and output powers, a battery supplying and receiving electrical energy required for inputting and outputting powers to and from the two motors, and a controller for controlling the internal combustion engine and the two motors (for example, Federal Republic of Germany Patent Application DE4124479A1). In this known power output apparatus, a crankshaft or an output shaft of the internal combustion engine is linked with a sun gear shaft, which connects with a sun gear of the planetary gear, via one-way clutch, whereas a carrier shaft, which connects with a planetary carrier of the planetary gear, is linked with driving wheels via a differential gate. A rotor of the second motor is attached to the sun gear shaft, so that power is transmitted between the second motor and the sun gear shaft. A rotor of the first motor is attached to a ring gear shaft, which connects with a ring gear of the planetary gear, so that power is transmitted between the first motor and the ring gear shaft. The power output apparatus further includes a clutch that connects the sun gear shaft with the ring gear shaft and thereby integrates the three shafts (sun gear shaft, ring gear shaft, and carrier shaft) linked with the planetary gear.

In this proposed power output apparatus, the sum of the power output from the internal combustion engine and the power input to or output from the second motor is given to the planetary gear, while the first motor gives a reaction force to the ring gear. This enables the power to be output to the carrier shaft and thereby drives the driving wheels. In order to give a braking force to the driving wheels, the clutch is connected to integrate the three shafts of the planetary gear and make the first motor and the second motor function as generators.

In case that the battery is in a fully charged state, however, the known power output apparatus can not make the first motor and the second motor function as generators nor output the braking force to the driving wheels. In this power output apparatus, the crankshaft and the sun gear shaft are connected to each other via the one-way clutch, so that a torque for rotating the internal combustion engine can not be transmitted from the sun gear shaft to the crankshaft. Namely the braking force can not be output to the driving wheels in the form of engine brake. Additional devices, such as a hydraulic circuit and an actuator, are required to ensure the operation of the clutch connecting the sun gear shaft to the ring gear shaft. This undesirably makes the whole power output apparatus complicated and bulky.

SUMMARY OF THE INVENTION

One object of the present invention is thus to provide a power output apparatus that outputs a power from an engine to a drive shaft via three shaft-type power input/output means which inputs and outputs powers regulated by a motor and that controls the motor in order to enable energy consumed by the engine to be output to the drive shaft as a braking force, as well as a method of controlling such a power output apparatus.

Another object of the present invention is to provide a power output apparatus that outputs a braking force to the drive shaft while storage battery means included in the apparatus is charged, discharged, or intact according to the charging state of the storage battery means, as well as a method of controlling such a power output apparatus.

Still another object of the present invention is to simplify the structure of and reduce the size of the power output apparatus.

At least part of the above and the other related objects is realized by a power output apparatus of the present invention for outputting powers to a drive shaft, the power output apparatus comprises: an engine having an output shaft; a motor having a rotating shaft and inputting and outputting power to and from the rotating shaft; three shaft-type power input/output means having three shafts respectively linked with the drive shaft, the output shaft, and the rotating shaft, the three shaft-type power input/output means inputting said outputting power to and from a residual one shaft, based on predetermined powers input to and output from any two shafts among the three shafts; storage battery means for supplying and receiving an electrical energy required for inputting and outputting power to and from the motor; and braking control means for controlling the engine and the motor; in order to enable a braking force to be applied to the drive shaft.

The power output apparatus of the present invention controls the engine and the motor, in order to enable powers input to and output from the output shaft of the engine and the rotating shaft of the motor to be applied to the drive shaft via the three shaft-type power input/output means. This structure thus allows the engine and the motor to output a braking force to the drive shaft.

In the power output apparatus of the present invention, the braking control means may include means for enabling the motor to carry out a regenerative operation, thereby applying a braking force to the drive shaft, or means for enabling the motor to carry out a power operation, thereby applying a braking force to the drive shaft. This preferable structure enables a braking force to be output to the drive shaft, while charging or discharging storage battery means.

In accordance with one aspect of the power output apparatus of the present invention, wherein the braking control means may include means for controlling the motor, in order to enable the motor to motor the engine. This structure enables energy used for motoring the engine to be output as a braking force to the drive shaft.

In accordance with another aspect of the power output apparatus of the present invention, wherein the braking control means may includes means for locking up the motor. This structure outputs a braking force to the drive shaft in the form of engine brake.

In accordance with still another aspect of the power output apparatus of the present invention, the power output apparatus further comprises a second motor for inputting and outputting power to and from the drive shaft, in addition to the motor working as a first motor; wherein the storage battery means comprises means for supplying and receiving an electrical energy required for inputting and outputting power to and from the second motor; the braking control means comprising means for controlling the engine, the first motor, and the second motor, in order to enable a braking force to be applied to the drive shaft. This structure (a) enables not only the engine and the first motor but the second motor to output a braking force to the drive shaft.

In accordance with one aspect of this structure (a), the power output apparatus further comprises charging the detection means for detecting a charging state of the storage battery means; wherein the braking control means comprises means for controlling the engine, the first motor, and the second motor based on the charging state of the storage battery means detected by the charging state detection means, thereby applying a braking force to the drive shaft. This structure sets the charging state of the storage battery means at a desired level. In this structure, the braking control means may include means for regulating the charging state of the storage battery means detected by the charging state detection means to be within a predetermined range. This structure keeps the charging state of the storage battery means within a predetermined range.

In accordance with another aspect of the structure (a), wherein the braking control means comprises means for controlling the second motor in order to enable the second motor to apply a braking force to the drive shaft, while controlling the first motor in order to make power input to and output from the first motor equal to zero. The three shaft-type power input/output means is stably kept in the state of least energy consumed by the first motor and the engine. This maximizes the energy regenerated by the second motor.

In accordance with still another aspect of the structure (a), wherein the braking control means comprises means for controlling the second motor in order to enable the second motor to apply a braking force to the drive shaft, while controlling the engine and the first motor in order to set a driving state of the engine to a predetermined operating condition. This structure sets the engine to a desired driving state in the course of braking control. The driving state of the engine may represent a revolving speed of the output shaft of the engine. In this structure, the power output apparatus may include: driving state detection means for detecting a driving state of the drive shaft, and braking-time driving state settling means for setting the predetermined operating condition based on the driving state of the drive shaft detected by the driving state detection means. This structure varies the driving state of the engine based on the driving state of the drive shaft.

In accordance with still another aspect of the structure (a), wherein the braking control means comprises means for controlling the first motor, in order to enable the first motor to motor the engine. This structure enables energy used for motoring the engine to be output as a braking force to the drive shaft.

In accordance with still another aspect of the structure (a), wherein the braking control means comprises means for controlling the first motor and the second motor, in order to enable an electrical energy regenerated by the second motor to be identical with an electrical energy consumed by the first motor. This structure enables a braking force to be output to the drive shaft, irrespective of the charging state of the storage battery means.

In accordance with still another aspect of the power output apparatus of the present invention, the power output apparatus may include a second motor for inputting and outputting power to and from the output shaft of the engine, in addition to the motor working as a first motor; wherein the storage battery means comprises means for supplying and receiving an electrical energy required for inputting and outputting power to and from the second motor; the braking control means comprising means for controlling the engine, the first motor, and the second motor, in order to enable a braking force to be applied to the drive shaft. This structure (b) regulates the power input to and output from the second motor, thereby applying a braking force to the drive shaft, while the engine and the fist motor also output a braking force to the drive shaft.

In accordance with one aspect of the structure (b), the power output apparatus may include charging state detection means for detecting a charging state of the storage battery means; wherein the braking control means comprises means for controlling the engine, the first motor, and the second motor based on the charging state of the storage battery means detected by the charging state detection means. This structure sets the charging state of the storage battery means at a desired level. In this structure, the braking control means may include means for regulating the charging state of the storage battery means detected by the charging state detection means to be within a predetermined range. This structure keeps the charging state of the storage battery means within a predetermined range.

In accordance with another aspect of the structure (b), wherein the braking control means may include means for controlling the first motor in order to enable the first motor to motor the engine, while controlling the second motor in order to enable the second motor to apply a braking force to the output shaft of the engine. This structure enables a greater braking force to be output to the drive shaft.

In accordance with still another aspect of the structure (b), wherein the braking control means comprises means for controlling the first motor and the second motor, in order to enable an electrical energy regenerated by the second motor to be identical with an electrical energy consumed by the first motor. This structure enables a braking force to be output to the drive shaft, irrespective of the charging state of the storage battery means.

At least part of the above and the other related objects is realized by a first method of controlling a power output apparatus for outputting power to a drive shaft, the first method comprises the steps of: (a) providing (1) an engine having an output shaft, (2) a motor having a rotating shaft and inputting and outputting power to and from the rotating shaft, and (3) three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; and (b) controlling the motor, in order to enable the motor to motor the engine, thereby applying a braking force to the drive shaft.

The first method of controlling a power output apparatus of the present invention enables energy used for motoring the engine to be output as a braking force to the drive shaft.

At least part of the above and the other related objects is realized by a second method of controlling a power output apparatus for outputting power to a drive shaft, the second method comprises the steps of: (a) providing (1) an engine having an output shaft, (2) a first motor having a rotating shaft and inputting and outputting powers to and from the rotating shaft, (3) a second motor for inputting and outputting power to and from the drive shaft, and (4) three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; (b) controlling the second motor, in order to enable the second motor to apply a braking force to the drive shaft; and (c) controlling the engine and the first motor, in order to set a driving state of the engine to a predetermined operating condition.

The second method of controlling a power output apparatus of the present invention enables the second motor to output a braking force to the drive shaft, while setting the engine to a desired driving state.

At least part of the above and the other related objects is realized by a third method of controlling a power output apparatus for outputting power to a drive shaft, the third method comprises the steps of: (a) providing (1) an engine having an output shaft, (2) a first motor having a rotating shaft and inputting and outputting power to and from the rotating shaft, (3) a second motor for inputting and outputting power to and from the drive shaft, (4) three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts, and (5) storage battery means for supplying and receiving an electrical energy required for inputting and outputting power to and from the first motor, and supplying and receiving an electrical energy required for inputting and outputting power to and from the second motor; and (b) controlling the engine, the first motor, and the second motor, in order to apply a braking force to the drive shaft while keeping a charging state of the storage battery means within a predetermined range.

The third method of controlling a power output apparatus of the present invention enables the engine, the first motor, and the second motor to output a braking force to the drive shaft, while keeping the charging state of the storage battery means within a predetermined range.

These and other objects, features, aspects, and advantages of the present invention will become apparent from the following detailed description of the preferred embodiments with the accompanying drawings.

DESCRIPTION OF THE PREFERRED EMBODIMENTS

Figure 1:
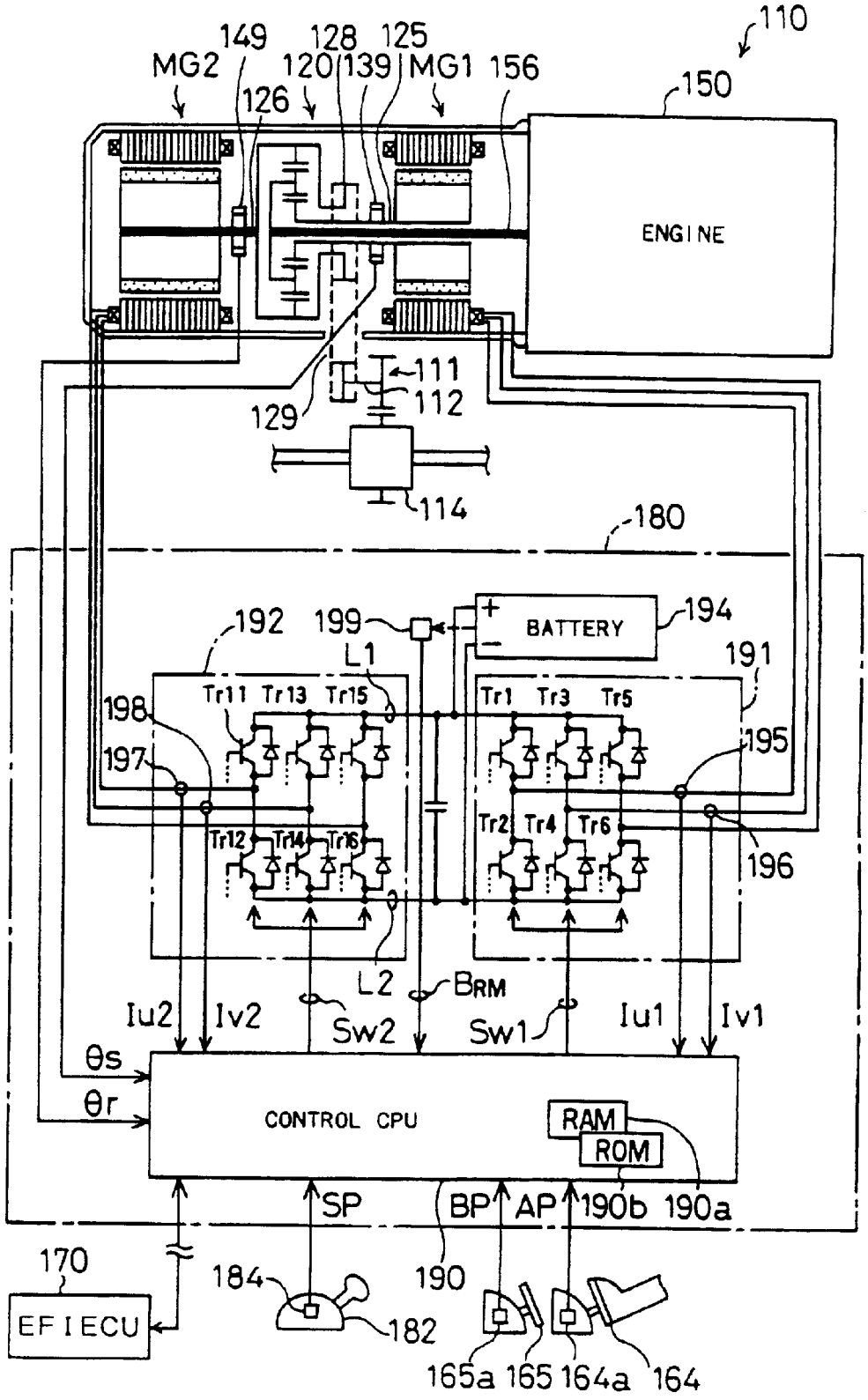
FIG. 1 schematically illustrates structure of a power output apparatus 110 embodying the present invention.
Figure 2:
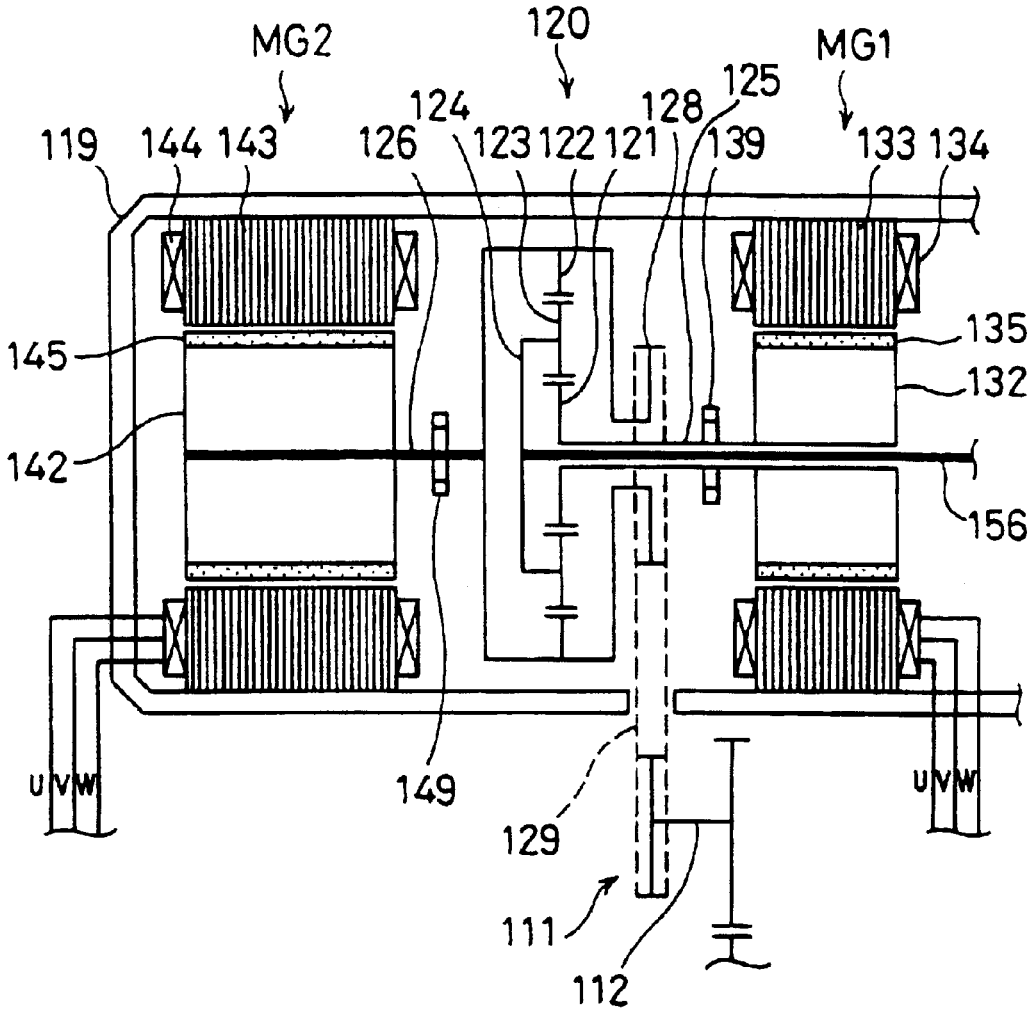
FIG. 2 is an enlarged view illustrating an essential part of the power output apparatus 110 of the embodiment.
Figure 3:
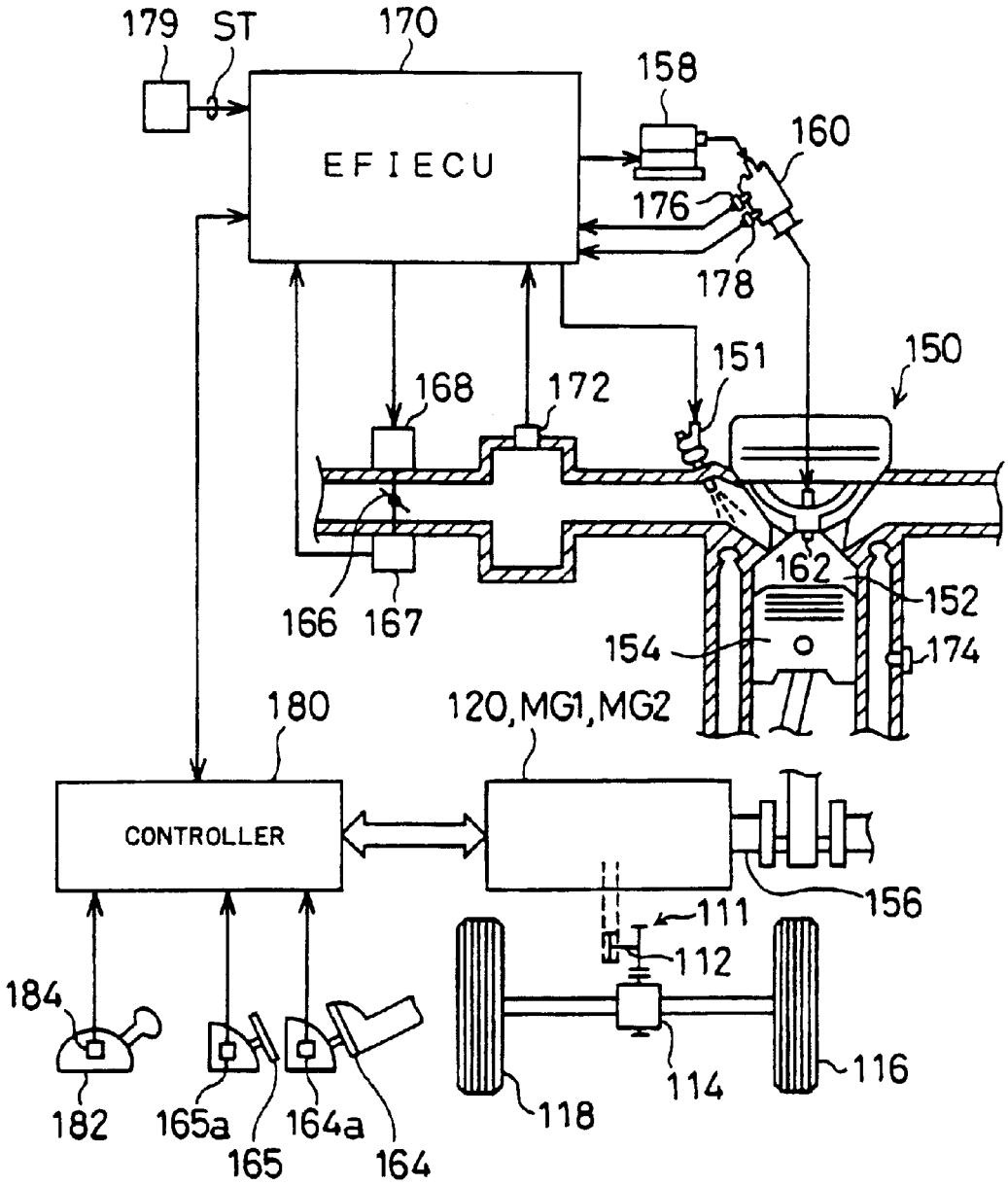
FIG. 3 schematically illustrates general structure of a vehicle with the power output apparatus 110 of the embodiment incorporated therein.

Some modes of carrying out the present invention are described as preferred embodiments. FIG. 1 schematically illustrates structure of a power output apparatus 110 embodying the present invention; FIG. 2 is an enlarged view illustrating as essential part of the power output apparatus 110 of the embodiment; and FIG. 3 schematically illustrates general structure of a vehicle with the power output apparatus 110 of the embodiment incorporated therein. The general structure of the vehicle is described first for the convenience of explanation.

Referring to FIG. 3, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 152 to be explosively ignited and burned. Linear motion of a piston 154 pressed down by the explosion of the air/fuel mixture is converted to rotational motion of a crankshaft 156. The throttle valve 166 is driven to open and close by an actuator 168. An ignition plug 162 converts a high voltage applied from an igniter 158 via a distributor 160 to a spark, which explosively ignites and combusts the air/fuel mixture.

Operation of the engine 150 is controlled by an electronic control unit (hereinafter referred to as EFIECU) 170. The EFIECU 170 receives information form various sensors, which detect operating conditions of the engine 150. These sensors include a throttle valve position sensor 167 for detecting a valve travel or position of the throttle valve 166, a manifold vacuum sensor 172 for measuring a load applied to the engine 150, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is mechanically linked with a power transmission gear 111, which has a drive shaft 112 as a rolling axis, via a planetary gear 120 and first and second motors MG1 and MG2 (described later in detail). The power transmission gear 111 is further linked with a differential gear 114, so that the power output from the power output apparatus 110 is eventually transmitted to left and right driving wheels 116 and 118. The first motor MG1 and the second motor MG2 are electrically connected to and controlled by a controller 180. The controller 180 includes an internal control CPU and receives inputs from a gearshaft position sensor 184 attached to a gearshift 182, an accelerator position sensor 164a attached to an acceleration pedal 164, and a brake pedal position sensor 165a attached to a brake petal 165, as described later in detail. The controller 180 sends and receives a variety of data and information to and from the EFIECU 170 through communication. Details of the control procedure including a communication protocol will be described later.

Referring to FIGS. 1 and 2, the power output apparatus 110 of the embodiment primarily includes the engine 150, the planetary gear 120 having a planetary carrier 124 mechanically linked with the crankshaft 156 of the engine 150, the first motor MG1 linked with a sun gear 121 of the planetary gear 120, the second motor MG2 linked with a ring gear 122 of the planetary gear 120, and the controller 180 for driving and controlling the first and the second motors MG1 and MG2.

The following describes structure of the planetary gear 120 and the first and second motors MG1 and MG2 based on the drawing of FIG. 2. The planetary gear 120 includes the sun gear 121 linked with a hollow sun gear shaft 125 which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the powers input to and output from any two shafts among the three shafts automatically determines the power input to and output from the residual one shaft. The details of the input and output operations of the power into and from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a synchronous motor-generated and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle θs.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle θr.

The controller 180 for driving and controlling the first and the second motor MG1 and MG2 has the following configuration. Referring back to FIG. 1, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190a used as a working memory, a ROM 190b in which various control programs are stored, an input/output port (not shown), and a serial communication port (not shown) through which data are sent to and received from the EFIECU 170. The control CPU 190 receives a variety of data via the input port. The input data include a rotational angle θs of the sun gear shaft 125 measured with the resolver 139, a rotational angle θr of the ring gear shaft 126 measured with the resolver 149, an accelerator pedal position AP (step-on amount of the accelerator pedal 164) output from the accelerator position sensor 164a, a brake pedal position BP (step-on amount of the brake pedal 165) output from the brake pedal position sensor 165a, a gearshift position SP output from the gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, and a remaining charge BRM of the battery 194 measured with a remaining charge meter 199. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U,V,W) 134 of the first motor MG1 are connected to the respective contacts of the paired transistors in the first driving circuit 191. The power lines L1 and L2 are respectively connected to plus and minus terminals of the battery 194. The control signal SW1 output from the control CPU 190 thus successively controls the power-on time of the paired transistors Tr1 through Tr6. The electric currents flowing through the three-phase coils 134 undergo PWM (pulse width modulation) control to give quasi-sine waves, which enable the three-phase coils 134 to form a revolving magnetic field.

The six transistors Tr1 through Tr16 in the second driving circuit 192 also constitute a transistor inverter and are arranged in the same manner as the transistors Tr1 through Tr6 in the first driving circuit 191. The three-phase coils (U,V,W) 144 of the second motor MG2 are connected to the respective contacts of the paired transistors in the second driving circuit 191. The second control signal SW2 output from the control CPU 190 thus successively controls the power-on time of the paired transistors Tr11 through Tr16. The electric currents flowing through the three-phase coils 144 undergo PWM control to give quasi-sine waves, which enable the three-phase coils 144 to form a revolving magnetic field.

Figure 4:
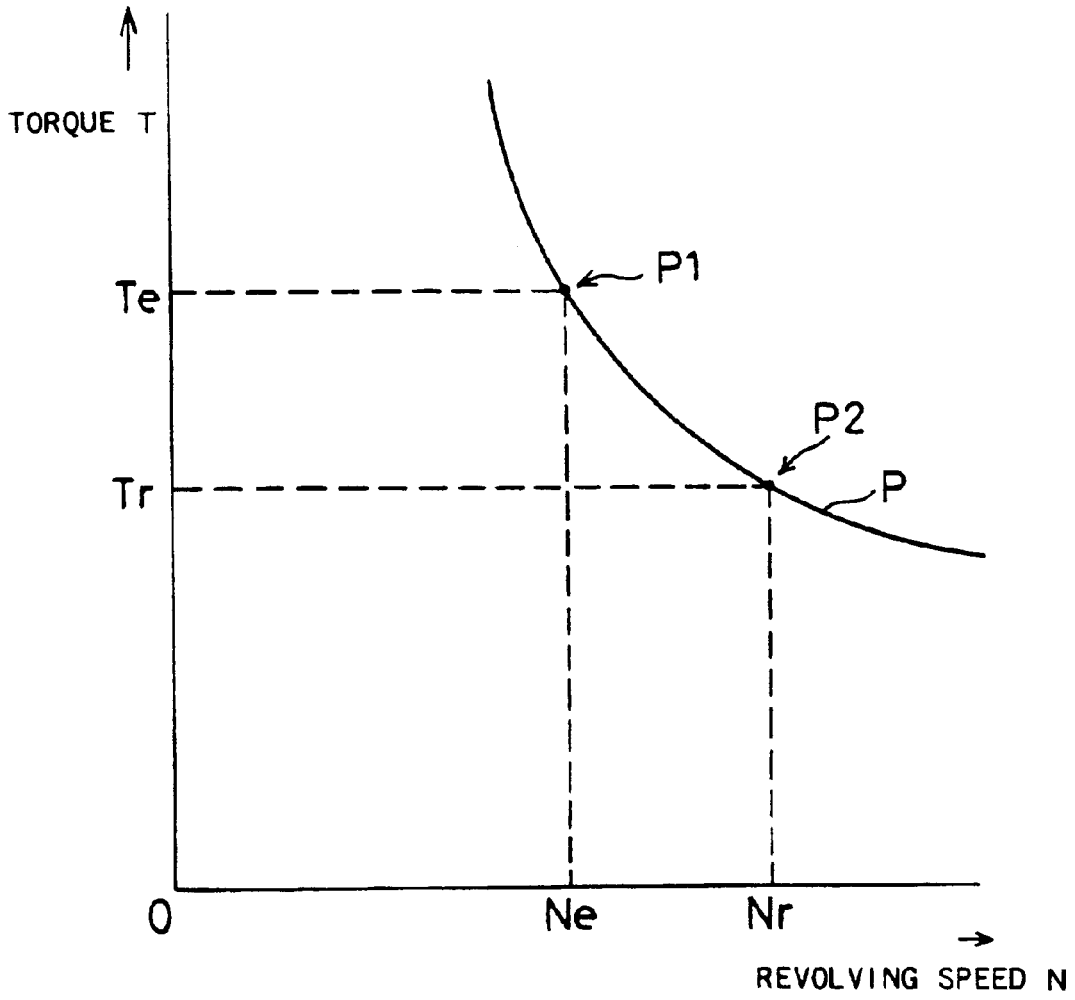
FIG. 4 is a graph showing the operation principle of the power output apparatus 110 of the embodiment.

The power output apparatus 110 of the embodiment thus constructed works in accordance with the operation principles discussed below, especially with the principle of torque conversion. By way of example, it is assumed that the engine 150 is driven at a driving point P1 of the revolving speed Ne and the torque Te and that the ring gear shaft 126 is driven at another driving point P2, which is defined by another revolving speed Nr and another torque Tr but gives an amount of energy identical with an energy Pe output from the engine 150. This means that the power output from the engine 150 is subjected to the torque conversion and applied to the ring gear shaft 126. The relationship between the torque and the revolving speed of the engine 150 and the ring gear shaft 126 under such conditions is shown in the graph of FIG. 4.

Figure 5:
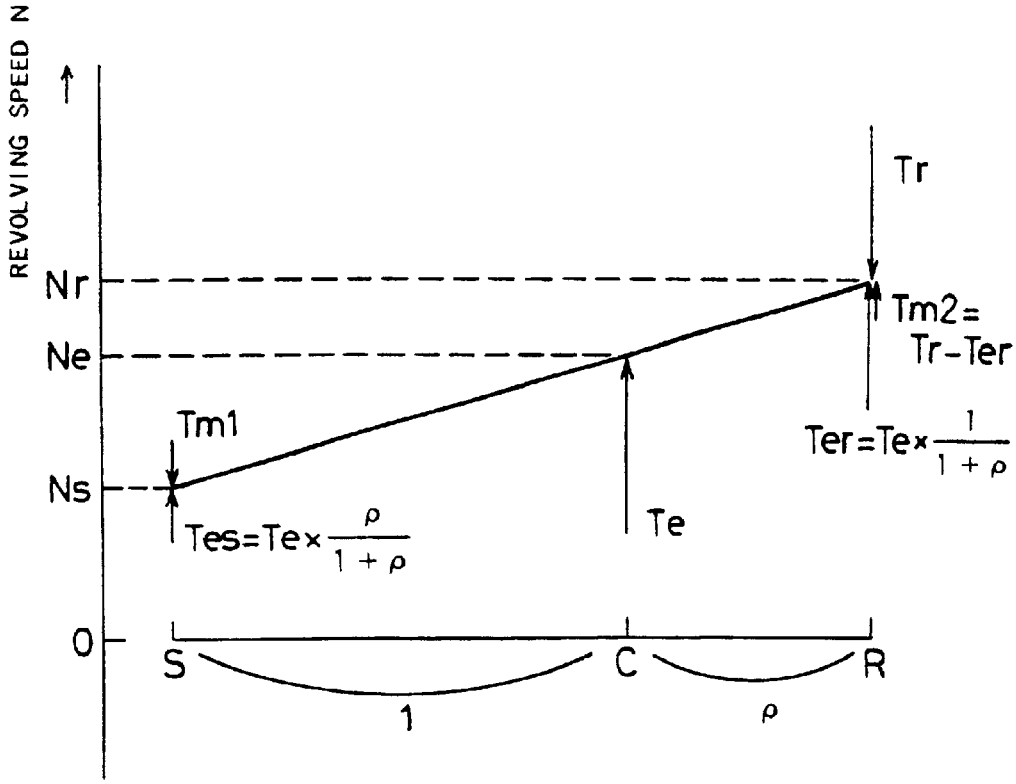
FIG. 5 is a nomogram showing the relationship between the revolving speed and the torque on the three shafts linked with the planetary gear 120 in the power output apparatus 110 of the embodiment.
Figure 6:
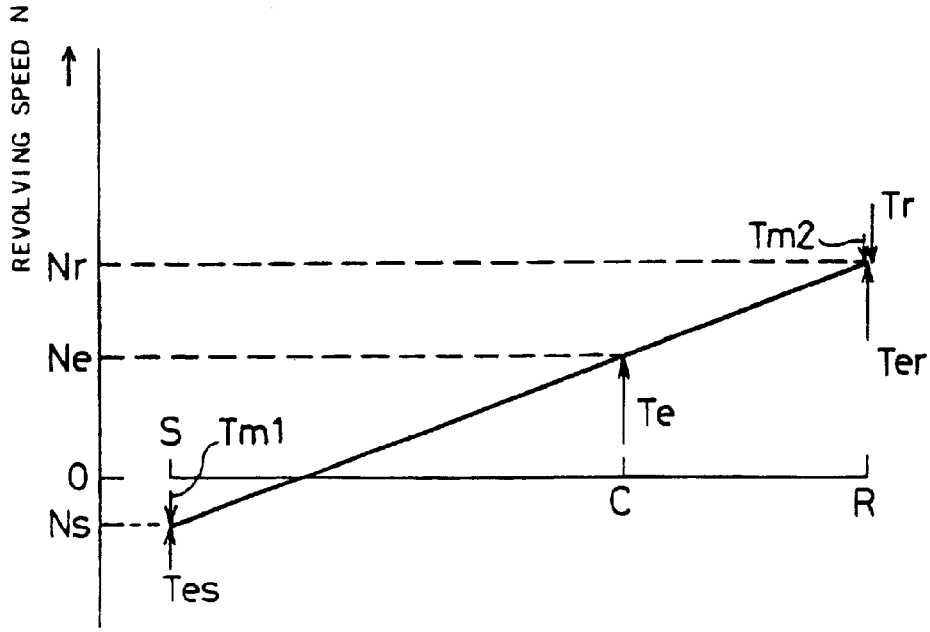
FIG. 6 is a nomogram showing the relationship between the revolving speed and the torque on the three shafts linked with the planetary gear 120 in the power output apparatus 110 of the embodiment.

According to the mechanics, the relationship between the revolving speed and the torque of the three shafts in the planetary gear 120 (that is, the sun gear shaft 125, the ring gear shaft 126, and the planetary carrier 124 (crankshaft 156)) can be expressed as nomograms illustrated in FIGS. 5 and 6 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in this embodiment.

In the nomogram of FIG. 5, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, where ρ represents a ratio of the number of teeth of the sun gear 121 to the number of teeth of the ring gear 122 and expressed as Equation (1) given below:

$$\rho = \frac{\text{the number of teeth of the sun gear}}{\text{the number of teeth of the ring gear}} \quad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as a dynamic collinear line. The revolving speed Ns of the sun gear shaft 125 can be calculated from the revolving speed Ne of the engine 150 and the revolving speed Nr of the ring gear shaft 126 according to a proportional expression given as Equation (2) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)\frac{1+\rho}{\rho} \tag{2}$$

The torque Te of the engine 150 is then applied (upward in the drawing) to the dynamic collinear line on the coordinate axis C of the planetary carrier 124 functioning as a line of action. The dynamic collinear line against the torque can be regarded as a rigid body to which a force is applied as a vector. Based on the technique of dividing the force into two different parallel lines of action, the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Tes\frac{\rho}{1+\rho} \tag{3}$$

$$Ter = Tes\frac{\rho}{1+\rho} \tag{4}$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy Pm2, which is given as the product of the torque Tm2 and the revolving speed Nr, as a power to the ring gear shaft 126.

In case that the electrical energy Pm1 is identical with the electrical energy Pm2, all the electric power consumed by the second motor MG2 can be regenerated and supplied by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 4, the power that is expressed as the product of the torque Te and the revolving speed Ne and output from the engine 150 driven at the driving point P1 is subjected to the torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the right gear shaft 126.

Although the revolving speed Ns of the sun gear shaft 125 is positive in the nomogram of FIG. 5, it may be negative according to the revolving speed Ne of the engine 150 and the revolving speed Nr of the ring gear shaft 126 as shown in the nomogram of FIG. 6. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the second motor MG2.

The above description refers to the fundamental torque conversion in the power output apparatus 110 of the embodiment. The power output apparatus 110 can, however, perform other operations as well as the above fundamental operation that carries out the torque conversion for all the power output from the engine 150 and outputs the converted torque to the ring gear shaft 126. The possible operations include an operation of charging the battery 194 with the surplus electrical energy and an operation of supplementing an insufficient electrical energy with the electric power stored in the battery 194. These operations are implemented by regulating the power output from the engine 150 (that is, the product of the torque Te and the revolving speed Ne), the electrical energy Pm1 regenerated or consumed by the first motor MG1, and the electrical energy Pm2 regenerated or consumed by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', and it is required to make the energy Pe output from the engine 150 a little greater than the energy Pr output to the ring gear shaft 126 or alternatively to make the energy Pr output to the ring gear shaft 126 a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 5, the torque Tm2 of the second motor MG2 may be calculated by multiplying the electric power regenerated by the first motor MG1 by the efficiencies of both the motors MG1 and MG2. In the state of the nomogram of FIG. 6, on the other hand, the torque Tm2 of the second motor MG2 may be calculated by dividing the electric power consumed by the first motor MG1 by the efficiencies of both the motors MG1 and MG2. In the planetary gear 120, there is an energy loss or heat loss due to a mechanical friction or the like, though the amount of energy loss is significantly small, compared with the whole amount of energy concerned. The efficiency of the synchronous motors used as the first and the second motors MG1 and MG2 is very close to the value of '1'. Known devices such as GTOs applicable to the transistors Tr1 through Tr16 have extremely small ON-resistance. The efficiency of power conversion is thus practically equal to the value '1'. For the matter of convenience, in the following discussion of the embodiment, the efficiency is considered equal to the value '1' (=100%), unless otherwise specified.

The following describes braking control of the vehicle which is driven by the power output from the engine 150 to the ring gear shaft 126 through the above torque conversion. There are three different types of braking control; that is, braking control by the first motor MG1 and the engine 150, braking control by the second motor MG2, and braking control by the first motor MG1, the second motor MG2, and the engine 150. In the braking control procedure by the second motor MG2 functioning as a generator, the rotational energy (kinetic energy) of the ring gear shaft 126, to which the rotation of the driving wheel 116 is linearly transmitted, is taken out as electrical energy and stored into the battery 194. The braking control by the second motor MG2 is a known procedure and is thus not specifically described here. The following describes first the braking control procedure by the first motor MG1 and the engine 150 and then the braking control procedure by the first motor MG1, the second moor MG2, and the engine 150. The braking control by the first motor MG1, the second motor MG2, and the engine 150 is a combination of the braking control by the first motor MG1 and the engine 150 discussed below with the conventional braking control by the second motor MG2.

In the braking control procedure by the first motor MG1 and the engine 150, the first motor MG1 motors the engine 150 via the planetary gear 120 while the fuel injection into the engine 150 stops. The energy required for friction and compression of the piston in the engine 150 that is being motored is subjected to a torque conversion and applied as a braking force to the ring gear shaft 126.

In the power output apparatus 110 of the embodiment kept in the shaft of the nomograms of FIGS. 5 and 6, it is assumed that both the torque Tm1 of the first motor MG1 and the torque Tm2 of the second motor MG2 are set equal to zero and that the operation of the engine 150 (fuel injection) is stopped. Under such conditions, the dynamic collinear line is stably kept in the state having the least sum of the energy required for racing the engine 150 and the energy required for racing the first motor MG1. Since the engine 150 is a four-cycle gasoline engine in the power output apparatus 110 of the embodiment, the energy required for racing the engine 150, that is, the energy required for friction and compression of the piston in the engine 150, is greater than the energy required for racing the rotor 132 of the first motor MG1. The dynamic collinear line is accordingly in the state of stopping the engine 150 and racing the first motor MG1 as shown in the nomogram of FIG. 7.

Figure 8:
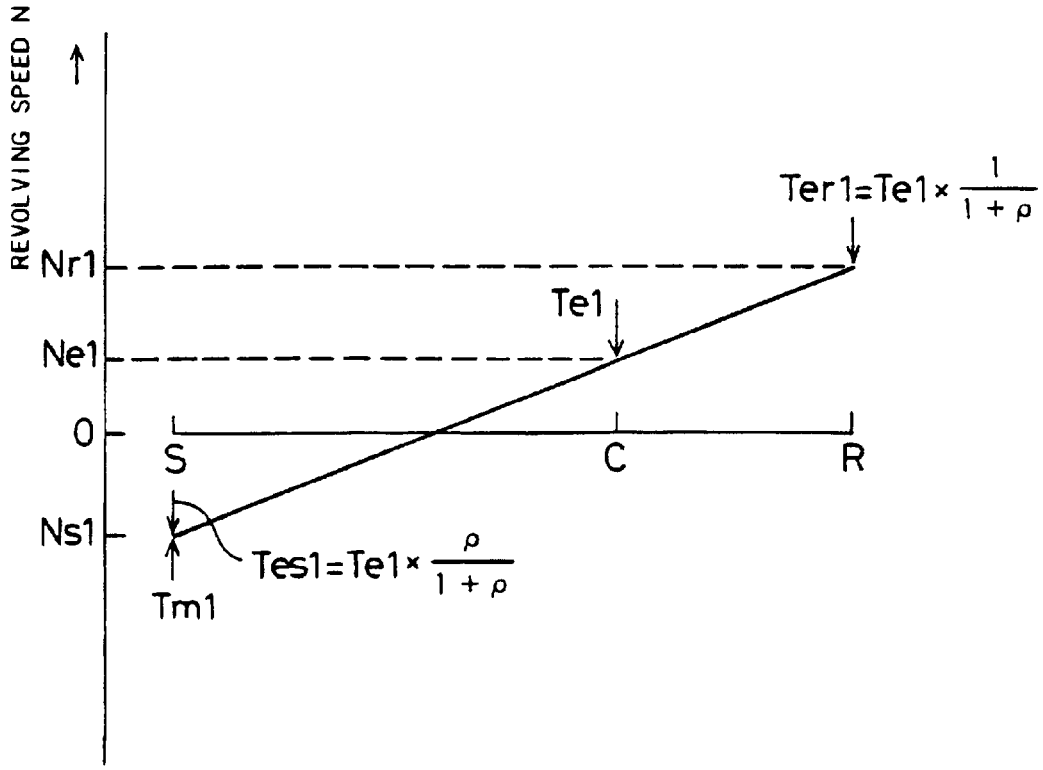
FIG. 8 is a nomogram showing the state when the first motor MG1 is controlled to carry out the regenerative operation and thereby enable a braking force to be applied to the ring gear shaft 126.

In case that the first motor MG1 is driven and controlled in this state to motor the engine 150 at a revolving speed NE1, the dynamic collinear line falls into the state shown in the nomogram of FIG. 8, Te1 denotes a torque output from the engine 150 as a reaction while the engine 150 is being motored at the revolving speed Ne1. A divisional torque Ter1 calculated from the torque Te1 according to Equation (4) is applied to the ring gear shaft 126 as discussed previously. The torque Te1 working as the reaction has a direction opposite to that of the torque Te output from the engine 150 while the engine 150 is being driven as shown in the nomograms of FIGS. 5 and 6. The divisional torque Ter1 acting on the ring shaft 126 thus functions as a braking force. In the state of the nomogram of FIG. 8, the direction of rotation of the sun gear shaft 125 is different from the direction of the torque Tm1 of the first motor MG1. The first motor MG1 accordingly functions as a generator and enables part of the rotational energy (kinetic energy) of the sun gear shaft 125 to be taken out as electrical energy, with which the battery 194 is charged. The torque Tm1 output from the first motor MG1 is calculated from the torque Te1 output from the engine 150 according to Equation (3) given above.

Figure 7:
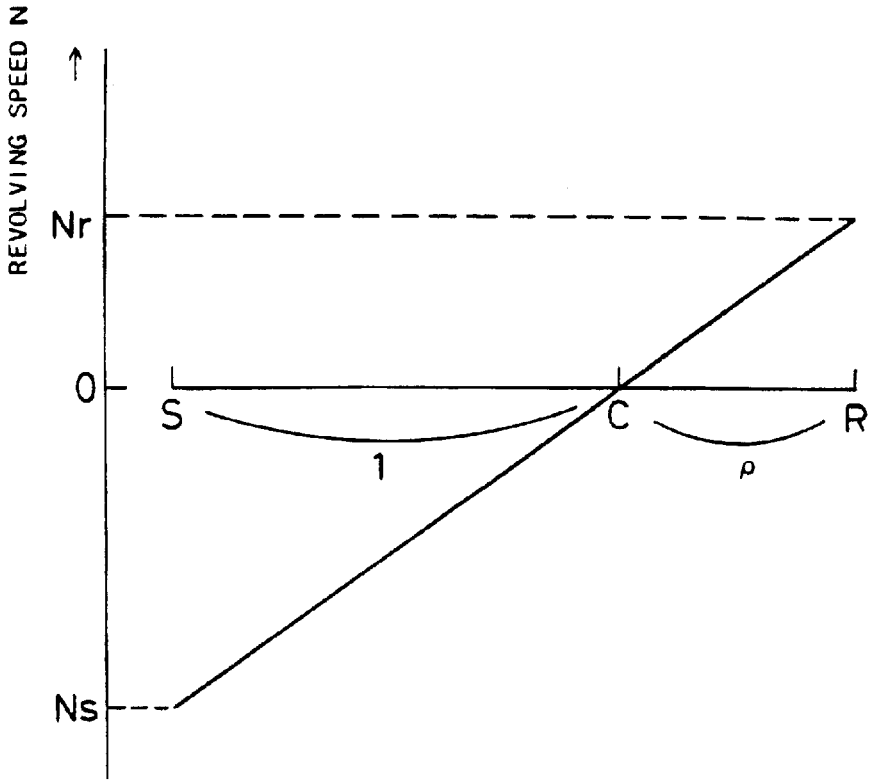
FIG. 7 is a nomogram showing the state when no torque is applied.
Figure 9:
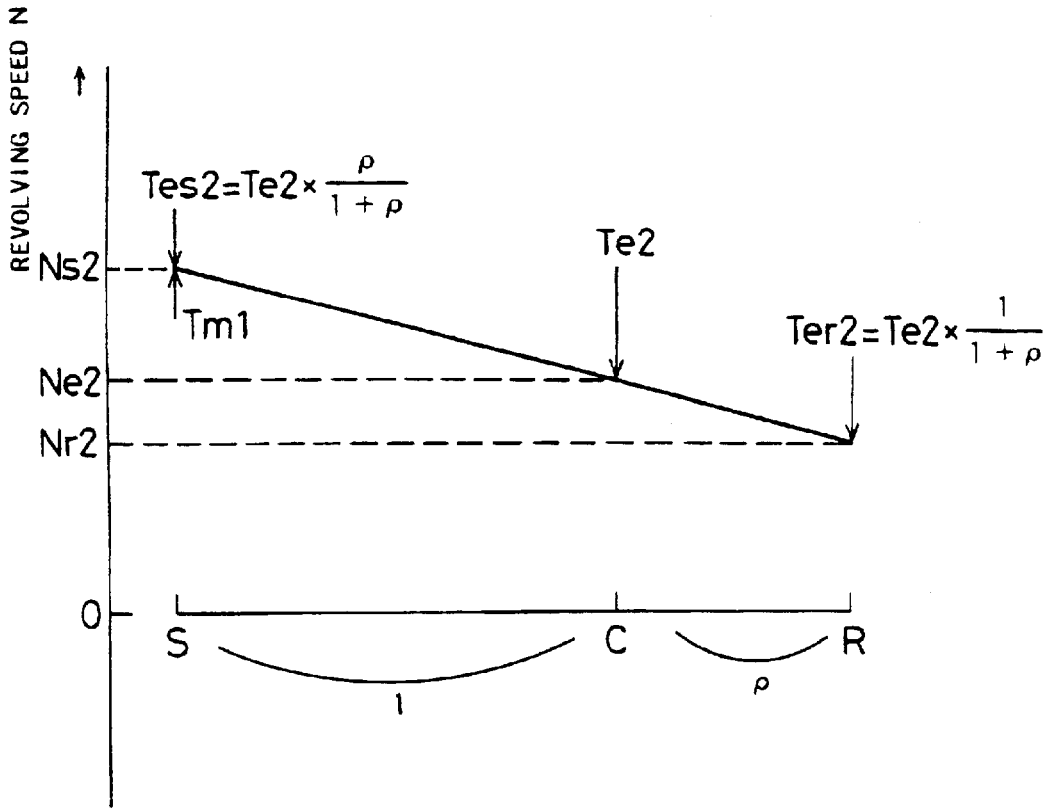
FIG. 9 is a nomogram showing the state when the first motor MG1 is controlled to carry out the power operation and thereby enable a braking force to be applied to the ring gear shaft 126.

The first motor MG1 may be driven and controlled in the state of the nomogram of FIG. 7 to motor the engine 150 at a revolving speed Ne2 as shown in the nomogram of FIG. 9. Tc2 denotes a torque working as a reaction while the engine 150 is being motored at the revolving speed Ne2. In the same manner as the nomogram of FIG. 8, a divisional torque Ter2 calculated from the torque Te2 according to Equation (4) is applied to the ring gear shaft 126 as a braking force. In the state of the nomogram of FIG. 9, the direction of rotation of the sun gear shaft 125 is identical with the direction of the torque Tm1 of the first motor MG1, and the motor MG1 accordingly functions as a motor. The electrical energy required for the operation of the first motor MG1 is supplied by the electric power discharged from the battery 194.

Figure 10:
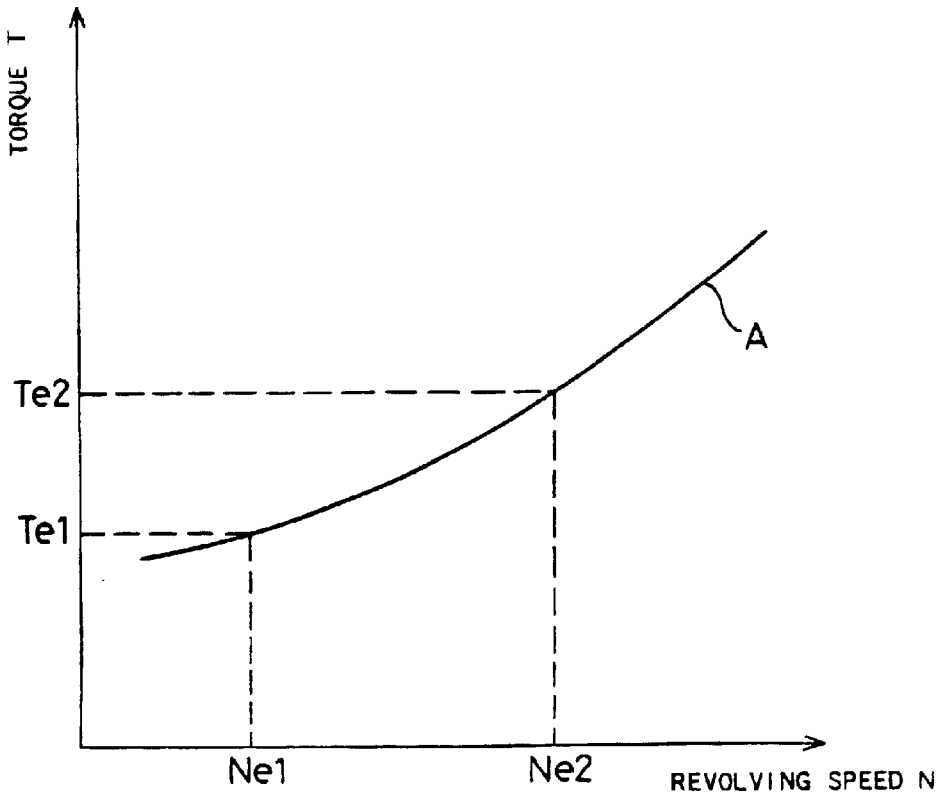
FIG. 10 is a graph showing the revolving speed Ne and the torque Te working as a reaction while the engine 150 is raced.

The relationship between the revolving speed Ne and the torque Te working as a reaction while the engine 150 is being motored, depends upon the type and characteristics of the engine 150. In this embodiment, this relationship is determined experimentally and stored in advance as a map in the ROM 190b. FIG. 10 shows one example of this map. The torque Te output as a reaction from the engine 150 depends upon the revolving speed Ne. The dynamic collinear line thus falls into the state of the nomogram of FIG. 8 or into the state of the nomogram of FIG. 9 according to the magnitude of the braking force applied to the ring gear shaft 126 and the revolving speed Nr of the ring gear shaft 126. The procedure of adequately specifying the magnitude of the braking force output to the ring gear shaft 126 by taking into account the revolving speed Nr of the ring gear shaft 126 enables the first motor MG1 to carry out either the regenerative operation or the power operation and thereby allows the battery 194 to be charged or discharged.

Figure 11:
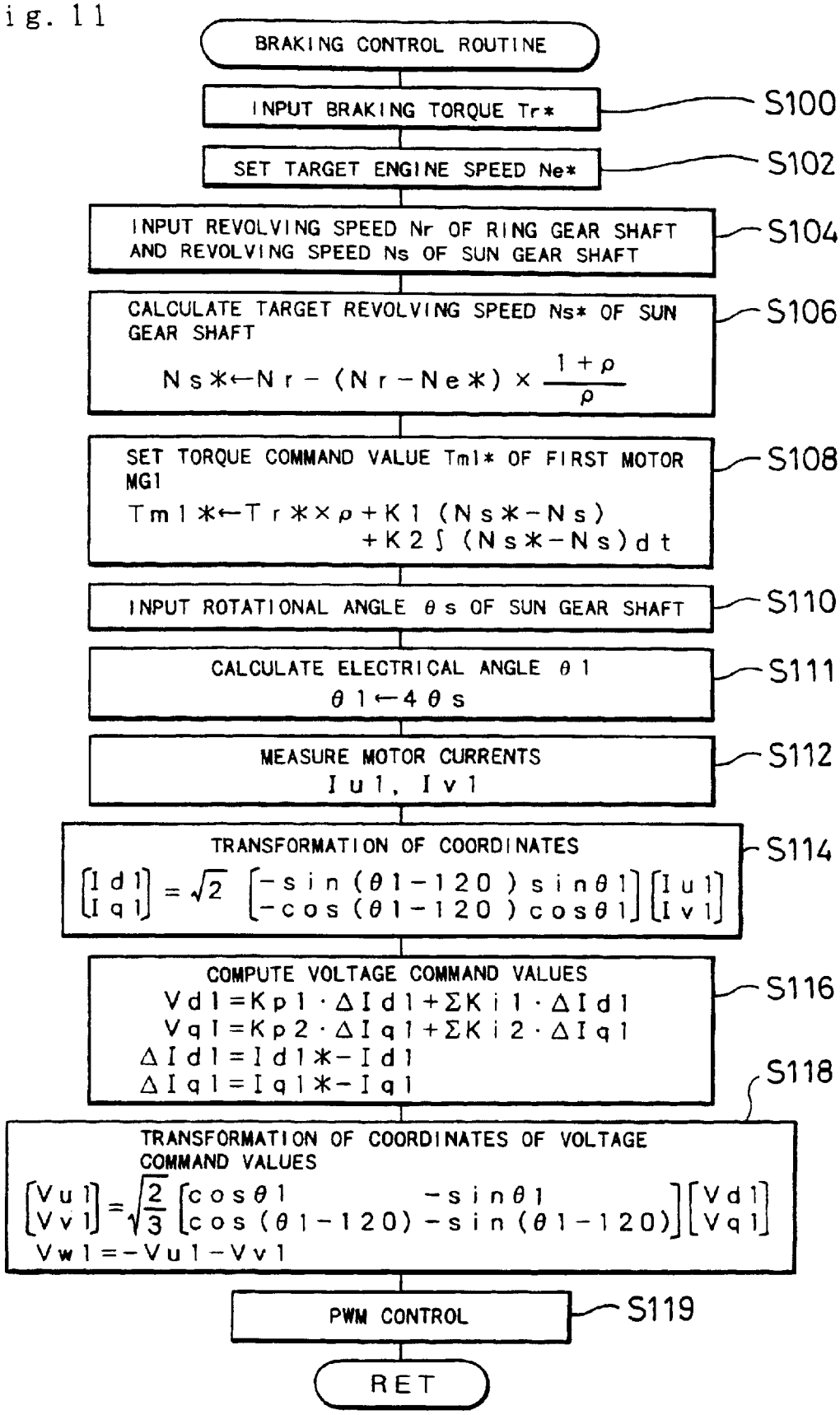
FIG. 11 is a flowchart showing a braking control routine executed by the control CPU 190 of the controller 180 in the first embodiment.

A fundamental braking control by the first motor MG1 and the engine 150 follows a braking control routine shown in the flowchart of FIG. 11. The braking control routine is executed repeatedly when the driver steps on the brake pedal 165 and a braking torque Tr* used in the process of braking control by the first motor MG1 and the engine 150 is set based on the step-on amount of the brake pedal 165. When this braking control routine is carried out, the control CPU 190 of the controller 180 concurrently outputs a stop signal to the EFIECU 170 through communications so as to stop the fuel injection into the engine 150.

When the program enters the routine of FIG. 11, the control CPU 190 of the controller 180 first reads the braking torque Tr* at step S100. The braking torque Tr* is set according to the step-on amount of the brake pedal 165 and written at a predetermined address in the RAM 190a. In accordance with a concrete procedure, the control CPU 190 reads the data of braking torque Tr* previously written at the redetermined address at step S100. The control CPU 190 then sets a target revolving speed Ne* of the engine 150 based on the braking torque Tr* at step S102. In order to output the braking torque Tr* to the ring gear shaft 126, the engine 150 is required to output the torque Te, which is obtained by substituting the value Tr* for the torque Ter in Equation (4) rewritten with respect to Te. In accordance with a concrete procedure, the revolving speed Ne corresponding to the torque Te thus obtained is read from the map shown in FIG. 10 and set as the target revolving speed Ne* at step S102.

After setting the target revolving speed Ne* of the engine 150, the control CPU 190 reads the revolving speed Nr of the ring gear shaft 126 and the revolving speed Ns of the sun gear shaft 125 at step S104. The revolving speed Ns of the sun gear shaft 125 may be calculated from the rotational angle θs of the sun gear shaft 125 read from the resolver 139, where as the revolving speed Nr of the ring gear shaft 126 may be calculated from the rotational angle θr of the ring gear shaft 126 read from the resolver 149. The control CPU 190 subsequently calculates a target revolving speed Ns* of the sun gear shaft 125 from the target revolving speed Ne* of the engine 150 and the revolving speed Nr of the ring gear shaft Nr according to Equation (5) given below at step S106. Equation (5) is obtained by substituting the target revolving speed Ne* of the engine 150 for Ne in Equation (2).

$$Ns^* \leftarrow Nr - (Nr - Ne^*) \times \frac{1+\rho}{\rho} \tag{5}$$

The control CPU 190 calculates and sets a torque command value Tm1* of the first motor MG1 according to Equation (6) given below at step S108. The first term on the right side of Equation (6) is obtained from the equilibrium on the dynamic collinear line shown in the nomogram of FIG. 8 or FIG. 9. The second term on the right side is a proportional term to cancel the deviation of the actual revolving speed Ns from the target revolving speed Ns*, and the third term on the right side is an integral term to cancel the stationary deviation. In the stationary state (that is, when the deviation of the revolving speed Ns from the target revolving speed Ns* is equal to zero), the torque command value Tm1* of the first motor MG1 is set equal to the first term on the right side Tr*xρ obtained from the equilibrium on the dynamic collinear line. K1 and K2 in Equation (6) denote proportional constants.

$$Tm1^* \leftarrow Tr^* x\rho + K1(Ns^* - Ns) + K2\int(Ns^* - Ns)dt \tag{6}$$

After setting the torque command value Tm1* of the first motor MG1, the control CPU 190 receives the rotational angle θs of the sun gear shaft 125 from the revolver 139 at step S110 and calculates an electrical angle θ1 of the first motor MG1 from the rotational angle θs of the sun gear shaft 125 at step S111. In this embodiment, since a synchronous motor of the four-pole pair (that is, four N poles and four S poles) is used as the first motor MG1, the rotational angle θs of the sun gear shaft 125 is quadrupled to yield the electrical angle θ1 (θ1=4θs). The control CPU 190 then detects values of currents Iu1 and Iv1 flowing through the U phase and V phase of the three-phase coils 134 in the first motor MG1 with the ammeters 195 and 196 at step S112. Although the currents naturally flow through all the three phases U, V, and W, measurement is required only for the currents passing through the two phases since the sum of the currents is equal to zero. At subsequent step S114, the control CPU 190 executes transformation of coordinates (three-phase to two-phase transformation) using the values of currents flowing through the three phases obtained at step 112. The transformation of coordinates maps the values of currents flowing through the three phases to the values of currents passing through d and q axes of the permanent magnet-type synchronous motor and is executed according to Equation (7) given below. The transformation of coordinates is carried out because the currents flowing through the d and q axes are essential for the torque control in the permanent magnet-type synchronous motor. Alternatively, the torque control may be executed directly with the currents flowing through the three phases.

$$\begin{bmatrix} Id1 \\ Iq1 \end{bmatrix} = \sqrt{2}\begin{bmatrix} -\sin(\theta 1 - 120) & \sin\theta 1 \\ -\cos(\theta 1 - 120) & \cos\theta 1 \end{bmatrix}\begin{bmatrix} Iu1 \\ Iv1 \end{bmatrix} \tag{7}$$

After the transformation to the currents of two axes, the control CPU 190 computes deviations of currents Id1 and Iq1 actually flowing through the d and q axes from current command values Id1* and Iq1* of the respective axes, which are calculated from the torque command value Tm1* of the first motor MG1, and subsequently determines voltage command values Vd1 and Vq1 with respect to the d and q axes at step S116. In accordance with a concrete procedure, the control CPU 190 executes arithmetic operations of Equations (8) and Equations (9) given below. In Equations (9), Kp1, Kp2, Ki1, and Ki2 represent coefficients, which are adjusted to be suited to the characteristics of the motor applied. Each voltage command value Vd1 (Vq1) includes a part in proportion to the deviation ΔI from the current command value I* (the first term on the right side of Equation (9)) and a summation of historical data of the deviations ΔI for 'i' times (the second term on the right side).

$$\Delta Id1 = Id1^* - Id1$$

$$\Delta Iq1 = Iq1^* - Iq1 \tag{8}$$

$$Vd1 = Kp1 \cdot \Delta Id1 + \Sigma Ki1 \cdot \Delta Id1$$

$$Vq1 = Kp2 \cdot \Delta Iq1 + \Sigma Ki2 \cdot \Delta Iq1 \tag{9}$$

The control CPU 190 then re-transforms the coordinates of the voltage command values thus obtained (two-phase to three-phase transformation) at step S118. This corresponds to an inverse of the transformation executed at step S114. The inverse transformation determines voltages Vu1, Vv1, and Vw1 actually applied to the three-phase coils 134 as expressed by Equations (10) given below:

$$\begin{bmatrix} Vu1 \\ Vv1 \end{bmatrix} = \sqrt{\frac{2}{3}}\begin{bmatrix} \cos\theta 1 & -\sin\theta 1 \\ \cos(\theta 1 - 120) & -\sin(\theta 1 - 120) \end{bmatrix}\begin{bmatrix} Vd1 \\ Vq1 \end{bmatrix} \tag{10}$$

$$Vw1 = -Vu1 - Vv1$$

The actual voltage control is accomplished by on-off operation of the transistors Tr1 through Tr6 in the first driving circuit 191. At step S119, the on- and off-time of the transistors Tr1 through Tr6 in the first driving circuit 191 is PWM (pulse with modulation) controlled, in order to attain the voltage command values Vu1, Vv1, and Vw1 determined by Equations (10) given above.

It is assumed that the torque command value Tm1* of the first motor MG1 is positive when the torque Tm1 is applied in the direction shown in the nomograms of FIGS. 8 and 9. For an identical positive torque command value Tm1*, the first motor MG1 is controlled to carry out the regenerative operation when the torque command value Tm1* acts in reverse of the rotation of the sun gear shaft 125 as in the state of the nomogram of FIG. 8, and controlled to carry out the power operation when the torque command value Tm1* acts in the direction of rotation of the sun gear shaft 125 as in the state of the nomogram of FIG. 9. For the positive torque command value Tm1*, both the regenerative operation and the power operation of the first motor MG1 implement the identical switching control. In accordance with a concrete procedure, the transistors Tr1 through Tr6 in the first driving circuit 191 are controlled to enable a possible torque to be applied to the sun gear shaft 125 by the combination of the magnetic field generated by the permanent magnets 135 set on the outer surface of the rotor 132 with the revolving magnetic field generated by the currents flowing through the three-phase coils 134. The identical switching control is executed for both the regenerative operation and the power operation of the first motor MG1 as long as the sign of the torque command value Tm1* is not changed. The braking control routine shown in the flowchart of FIG. 11 is thus applicable to both the regenerative operation and the power operation.

The above and control procedure sets the dynamic collinear line either in the state of the nomogram of FIG. 8 or in the state of the nomogram of FIG. 9 and enables the braking force to be applied to the ring gear shaft 126 and eventually to the driving wheels 116 and 118.

As discussed above, the power output apparatus 110 of the embodiment carries out the braking control by the first motor MG1 and the engine 150 and enables the braking force to be applied to the ring gear shaft 126 and eventually to the driving wheels 116 and 118. The procedure of adequately specifying the magnitude of the braking torque Tr* output to the ring gear shaft 126 by taking into account the revolving speed Nr of the ring gear shaft 126 enables the first motor MG1 to carry out the regenerative operation for braking and charge the battery 194 or enables the first motor MG1 to carry out the power operation for braking and discharge the battery 194. Namely the first motor MG1 can implement braking by the regenerative operation or by the power operation according to the remaining charge BRM of the battery 194.

In the braking control routine of the embodiment, the torque command value Tm1* of the first motor MG1 and the target revolving speed Ns* of the sun gear shaft 125 are set to enable the preset braking torque Tr* to be output to the ring gear shaft 126 by means of the first motor MG1 and the engine 150. In accordance with another possible application, the braking torque Tr* may be set based on the remaining charge BRM of the battery 194. This structure keeps the remaining charge BRM of the battery 194 at a desired level.

Although the fuel injection into the engine 150 is stopped in the embodiment, the fuel injection may be carried out to rotate the engine 150 at an idle revolving speed or another adequate revolving speed. The torque Te working as a reaction in the latter case is different from that in the case of the embodiment. The relationship between the amount of fuel injection, the revolving speed Ne, and the torque Te working as a reaction should thus be determined in advance and stored as a map.

Figure 12:
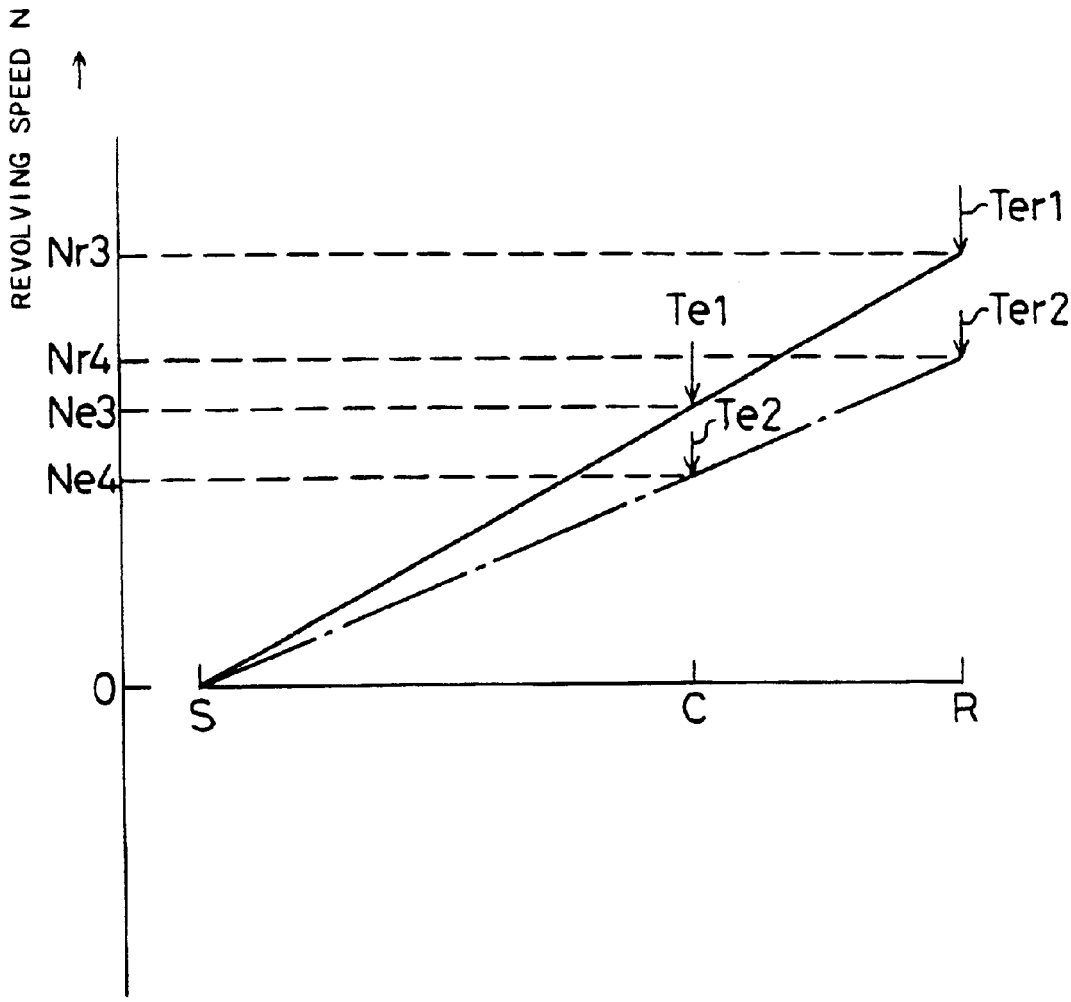
FIG. 12 is a nomogram showing the state when a braking force is applied to the ring gear shaft 126 while the first motor MG1 is in a lock-up state.

The braking control procedure of the embodiment positively controls the first motor MG1, in order to enable the braking torque Tr* to be applied to the ring gear shaft 126 as a braking force. An alternative braking control procedure electromagnetically fixes the rotor 132 of the first motor MG1, that is, locks up the first motor MG1, in order to enable the braking force to be applied to the ring gear shaft 126. FIG. 12 is a nomogram in this state. While the sun gear shaft 125 is fixed, the planetary gear 120 works as a reduction gear. The rotation of the ring gear shaft 126 multiplied by a reduction ratio is accordingly transmitted as the rotation of the crankshaft 156. This is equivalent to the operation of engine brake. The control operation of the first motor MG1 in this case turns off all the transistors Tr1 through Tr6 in the first driving circuit 191 for driving the first motor MG1.

The following describes the braking control procedure by the first motor MG1, the second motor MG2, and the engine 150. As mentioned previously, the braking control by the first motor MG1, the second motor MG2, and the engine 150 is a combination of the braking control by the first motor MG1 and the engine 150 with the braking control by the second motor MG2. This braking control includes a variety of operations: for example, the operation of applying a braking force corresponding to the step-on amount of the brake pedal 165 to the ring gear shaft 126 and the operation of applying a braking force to the ring gear shaft 126 irrespective of the step-on of the brake pedal 165 while the vehicle runs down a long, continuous slope. In this embodiment, the operation of applying a braking force corresponding to the step-on amount of the brake pedal 165 to the ring gear shaft 126 follows a torque control routine in a braking state shown in the flowcharts of FIGS. 13 and 14. The operation of applying a braking force to the ring gear shaft 126 irrespective of the step-on of the brake pedal 165 while the vehicle runs down a long, continuous slope, follows a continuous braking control routine shown in the flowchart of FIG. 24.

Figure 13:
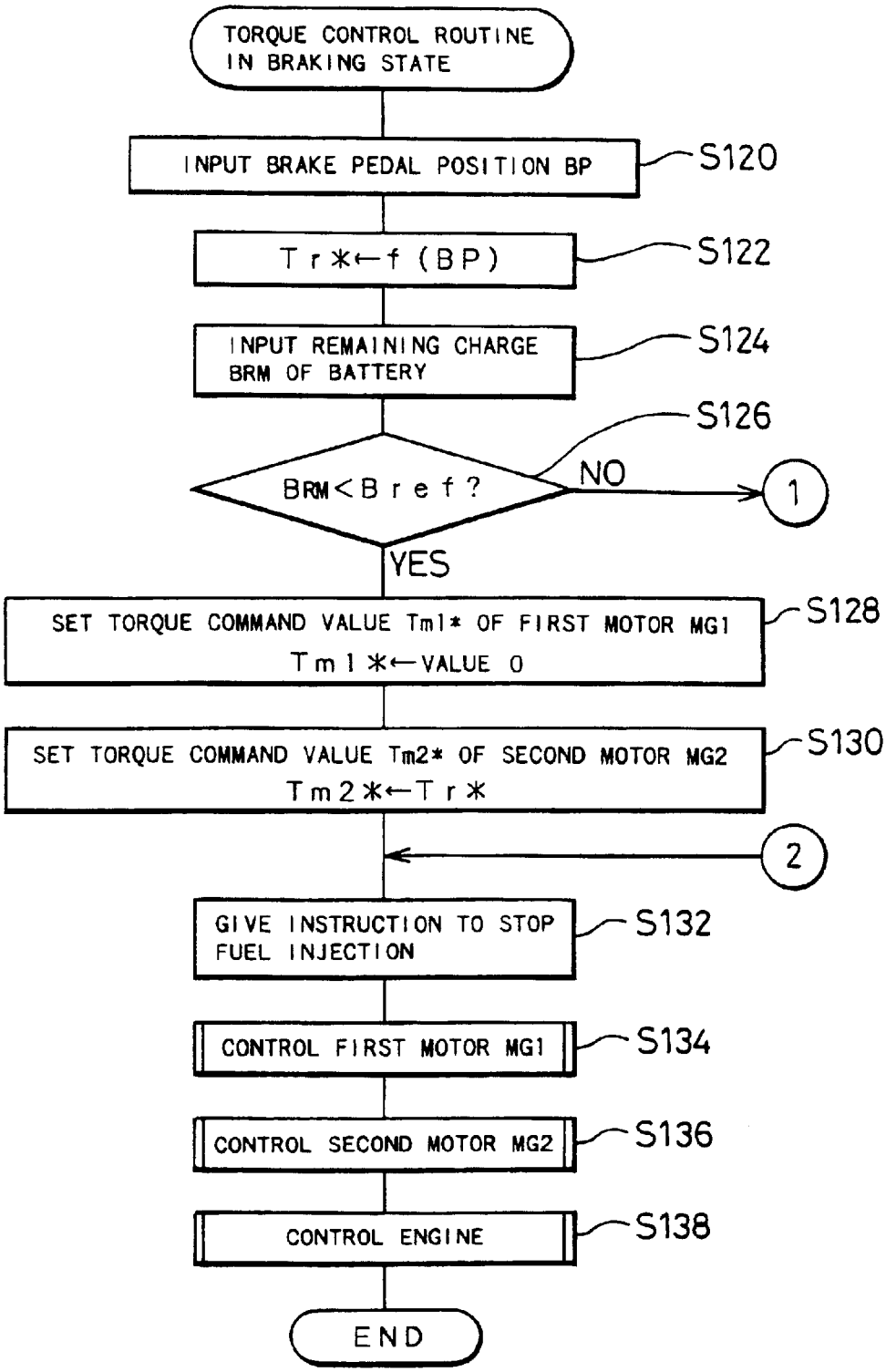
FIGS. 13 and 14 are flowcharts showing a torque control routine in a braking state executed by the control CPU 190 of the controller 180 in the first embodiment.
Figure 14:
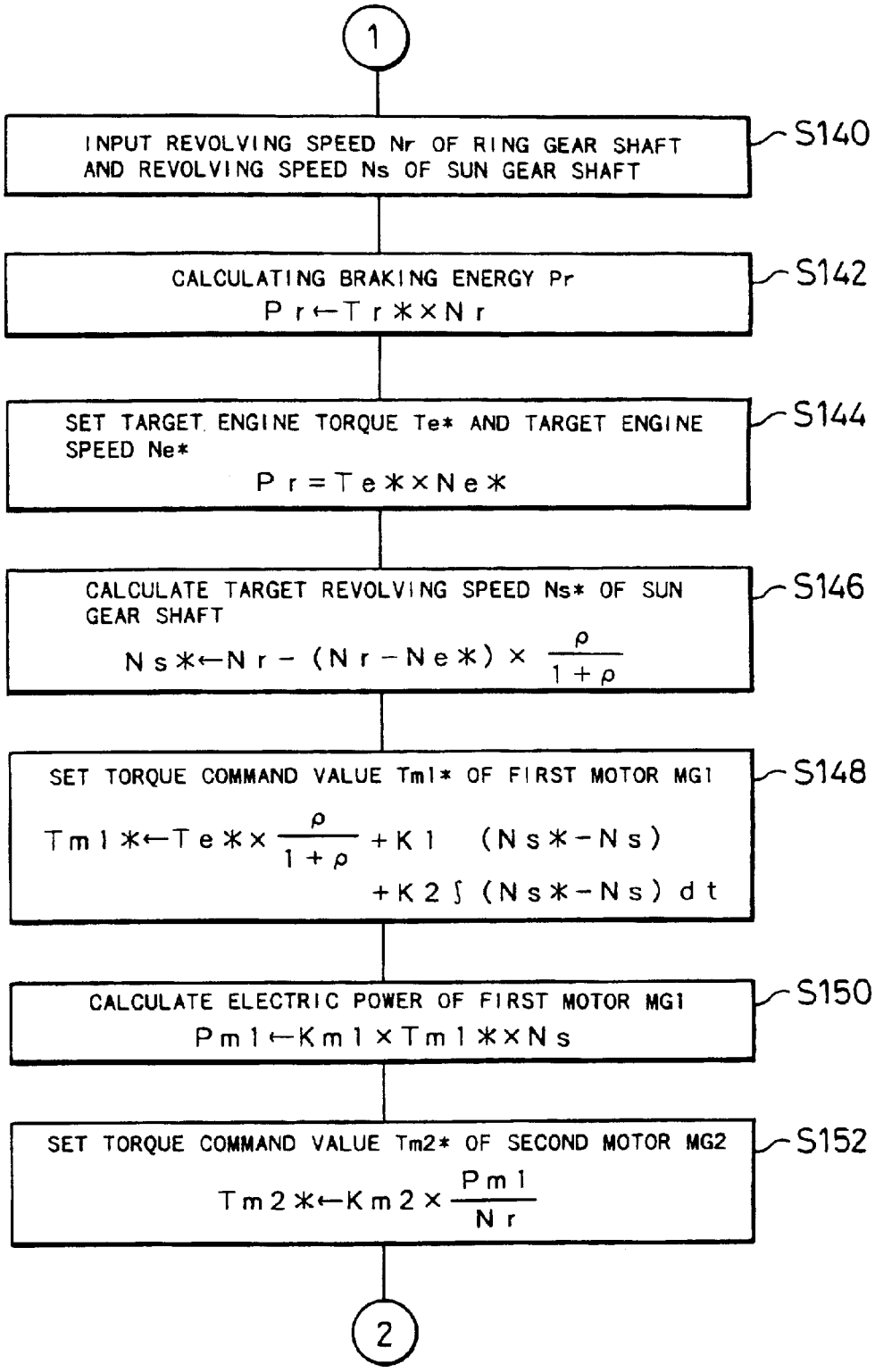

The torque control routine in the braking state shown in the flowcharts of FIGS. 13 and 14 is executed repeatedly at predetermined time intervals (for example, at every 8 msec) while the vehicle runs. When the program enters the routine of FIG. 13, the control CPU 190 of the controller 180 first reads the brake pedal position BP detected by the brake pedal position sensor 165a at step S120. The driver steps on the brake pedal 165 to apply the braking force to the driving wheels 116 and 118. The value of the brake pedal position BP accordingly represents the desired braking torque which the driver requires. The control CPU 190 subsequently determines the braking torque Tr* to be output to the ring gear shaft 126, based on the input brake pedal position BP at step S122. Not the braking torque to be output to the driving wheels 116 and 118 but the braking torque Tr* to be output to the ring gear shaft 126 is determined here according to the brake pedal position BP. This is because the ring gear shaft 126 is mechanically linked with the driving wheels 116 and 118 via the power feed gear 128, the power transmission gear 111, and the differential gear 114 and the determination of the braking torque Tr* to be output to the ring gear shaft 126 thus results in determining the braking torque to be output to the driving wheels 116 and 118. In this embodiment, a map representing the relationship between the braking torque Tr* and the brake pedal position BP is prepared in advance and stored in the ROM 190b. In accordance with a concrete procedure, at step S122, the braking torque Tr* corresponding to the input brake pedal position BP is read from the map stored in the ROM 190b.

Figure 15:
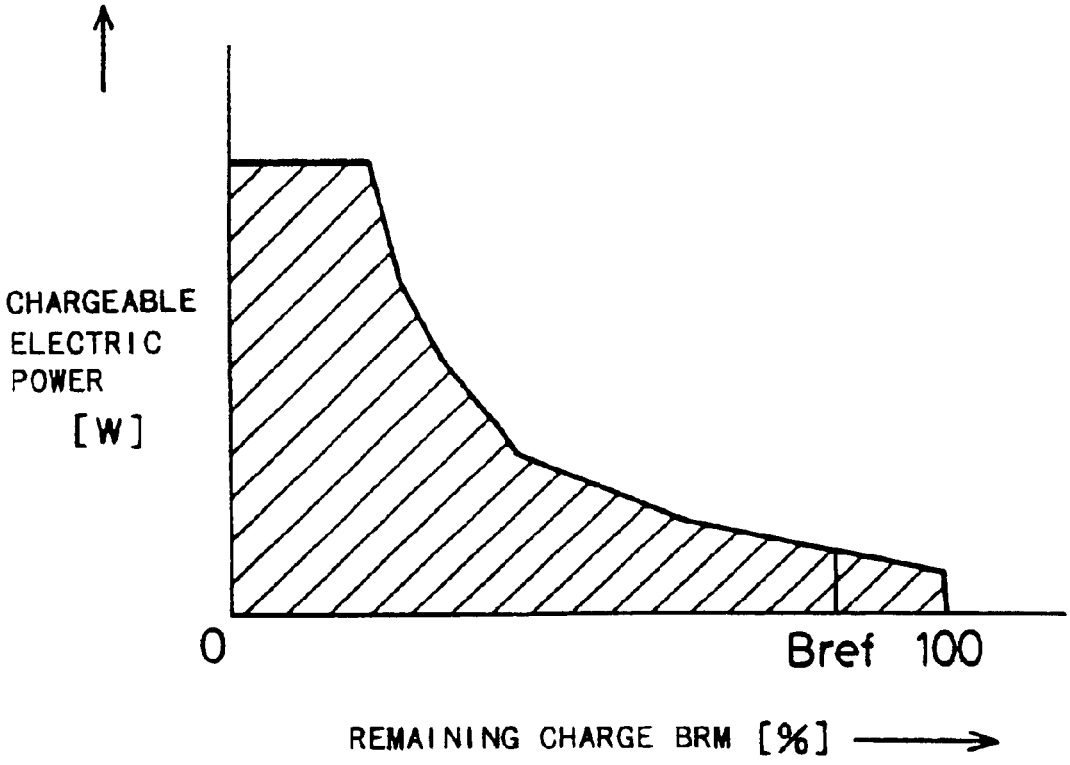
FIG. 15 is a graph showing the relationship between the remaining charge BRM of the battery 194 and the chargeable electrical power with a threshold value Bref.

The control CPU 190 then reads the remaining charge BRM of the battery 194 measured by the remaining charge meter 199 at step S124, and compares the input remaining charge BRM of the battery 194 with a threshold value Bref at step S126. The threshold value Bref is set as a value close to the fully charged state in which the battery 194 does not require any further charging, and depends upon the type and characteristics of the battery 194. FIG. 15 is a graph showing the relationship between the remaining charge BRM of the battery 194 and the chargeable electric power with the threshold value Bref.

In case that the remaining charge BRM of the battery 194 is less than the threshold value Bref at step S126, the program determines the necessity for charging the battery 194 and sets the torque command value Tm1* of the first motor MG1 equal to the zero at step S128 while setting the braking amount Tr* to a torque command value Tm2* of the second motor MG2 at step S130. The control CPU 190 then outputs a signal to stop the fuel injection into the engine 150 from the communication port to the EFIECU 170 at step S132. The program subsequently controls the first motor MG1, the second motor MG2, and the engine 150 based on the preset values at step S134 through S138. As a matter of convenience of illustration, the control operations of the first motor MG1, the second motor MG2, and the engine 150 are shown as separate steps. In the actual procedure, however, these control operations are carried out in parallel and comprehensively. By way of example, the control CPU 190 simultaneously controls the first motor MG1 and the second motor MG2 by utilizing an interrupting process, while transmitting an instruction to the EFIECU 170 through communication in order to allow the EFIECU 170 to control the engine 150 concurrently.

Figure 16:
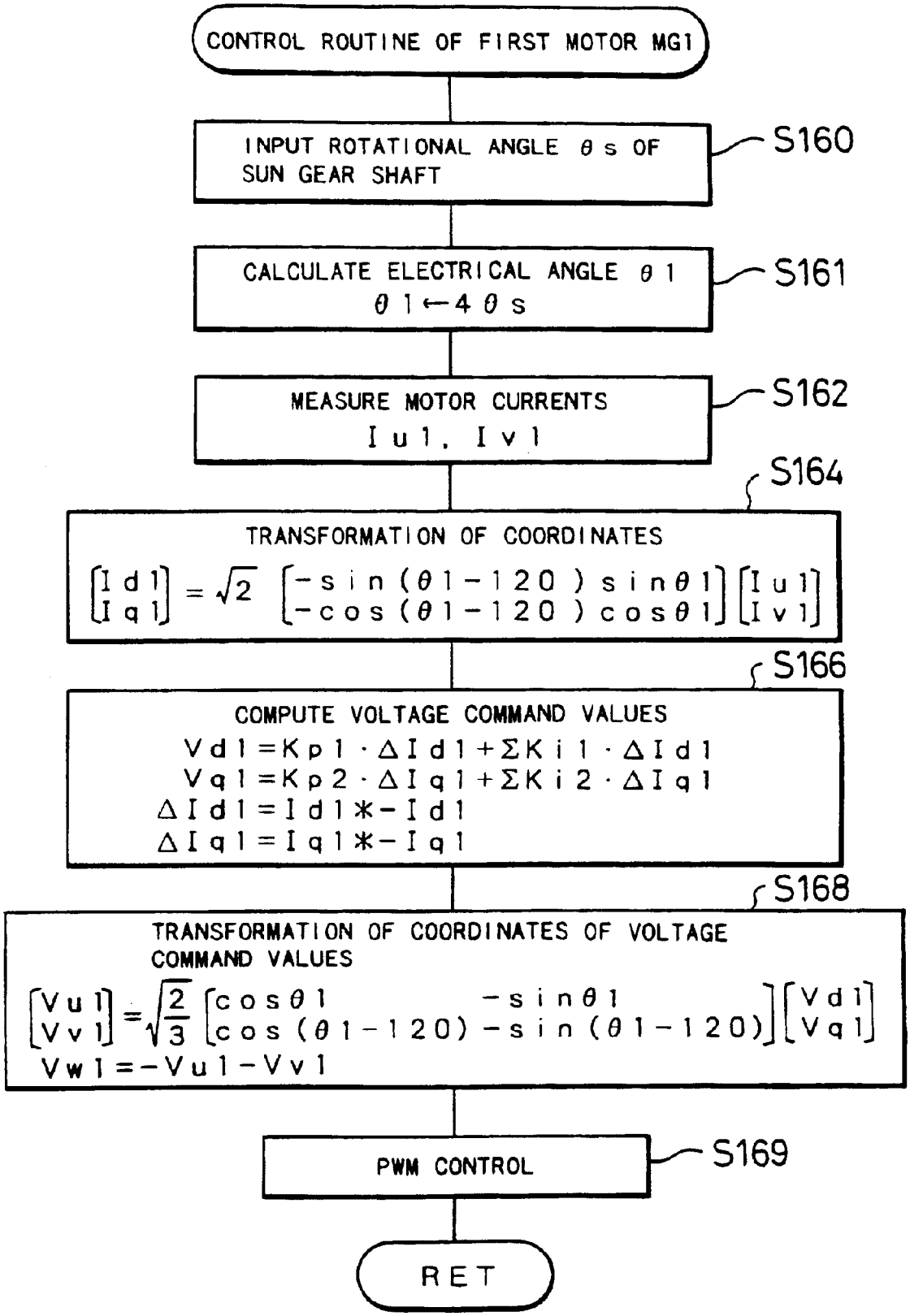
FIG. 16 is a flowchart showing a control routine of the first motor MG1 executed by the control CPU 190 of the controller 180.
Figure 17:
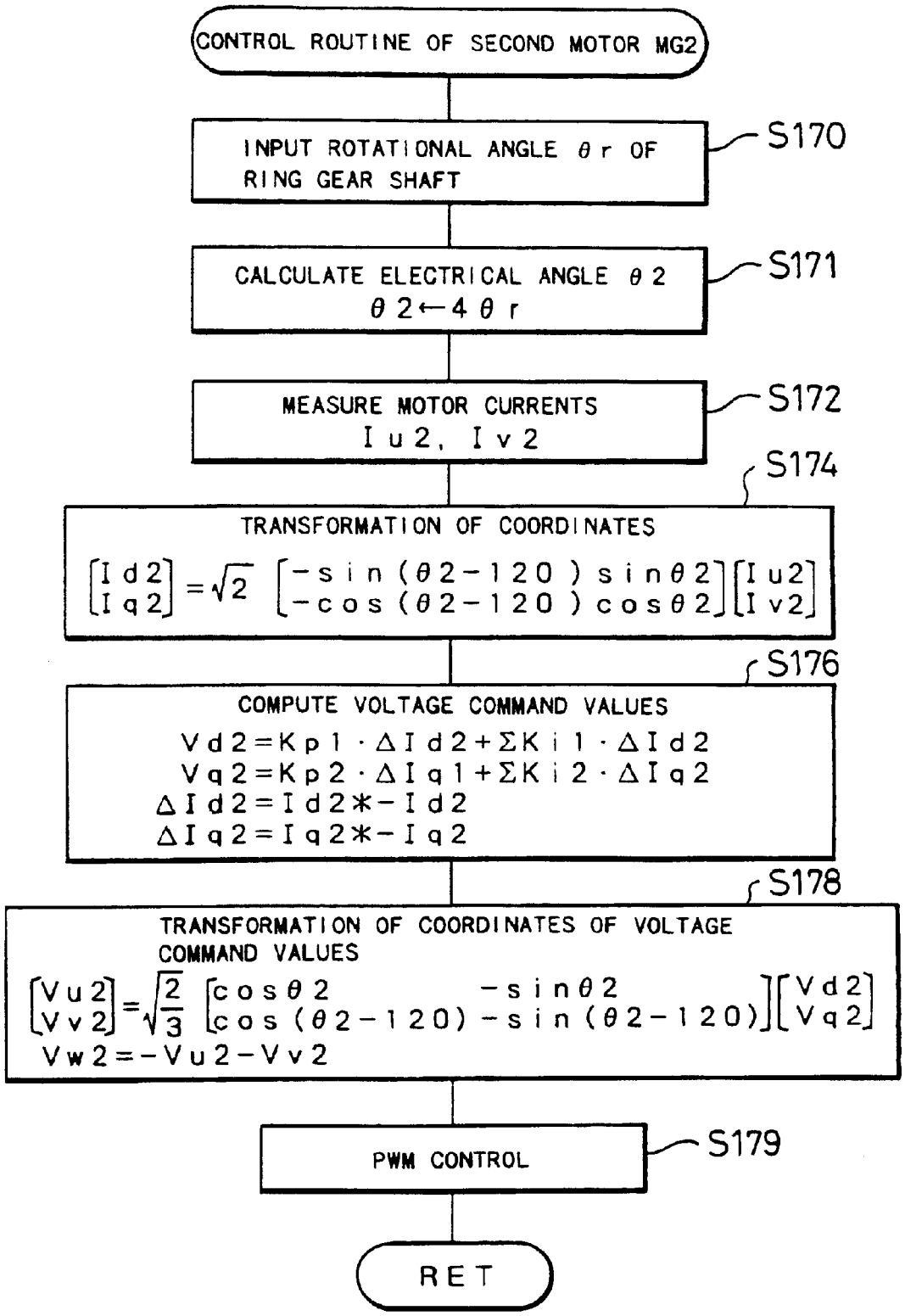
FIG. 17 is a flowchart showing a control routine of the second motor MG2 executed by the control CPU 190 of the controller 180.

The control of the first motor MG1 follows a control routine of the first motor MG1 shown in the flowchart of FIG. 16, whereas the control of the second motor MG2 follows a control routine of the second motor MG2 shown in the flowchart of FIG. 17. These control routines are identical with the processing steps S110 through S119 in the braking control routine of FIG. 11 and are not specifically described here. When the torque command value Tm1* of the first motor MG1 is set equal to zero, the control of the first motor MG1 does not follow the control routine of the first motor MG1 shown in the flowchart of FIG. 16 but turns off all the transistors Tr1 through Tr6 in the first driving circuit 191, as discussed previously. The control of the engine 150 is carried out by the EFIECU 170 which receives the instruction to stop the fuel injection. The EFIECU 170 actually stops the fuel injection as well as the ignition with the ignition plug 162, thereby stopping the operation of the engine 150.

Figure 18:
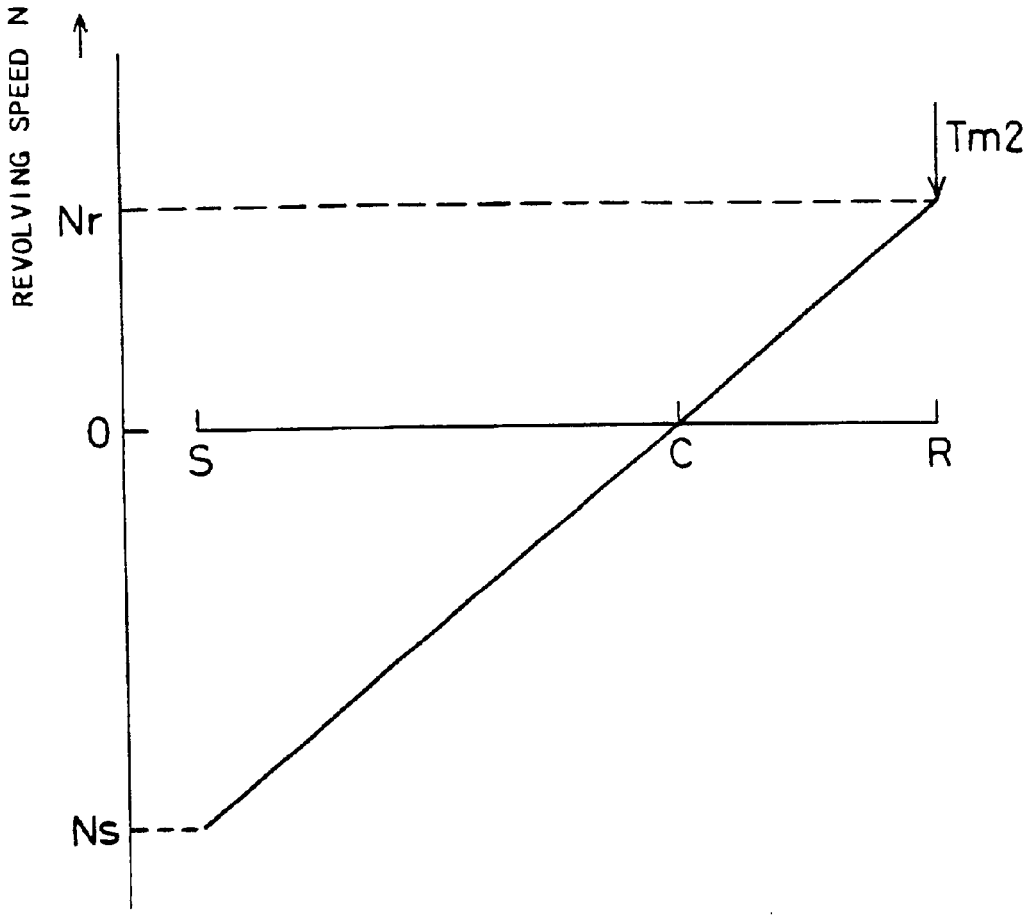
FIG. 18 is a nomogram showing the state when a braking force is applied to the ring gear shaft 126 while the battery 194 is charged in the first embodiment.

When the remaining charge BRM of the battery 194 is determined to be less than the threshold value Bref at step S126, the operation of setting both the torque Tm1 of the first motor MG1 and the torque Tm2 of the second motor MG2 equal to zero and stopping the operation of the engine 150 (fuel injection) discussed above with the nomogram of FIG. 7 is combined with the operation of enabling the second motor MG2 to apply a torque corresponding to the torque command value Tm2* to the ring gear shaft 126. As shown in the nomogram of FIG. 18, this procedure stops the engine 150 and races the first motor MG1. As discussed previously, this state consumes the least energy, so that a greater portion of the rotational energy (kinetic energy) of the ring gear shaft 126 can be regenerated as electrical energy by the second motor MG2 and stored in the battery 194.

In case that the remaining charge BRM of the battery 194 is not less than the threshold value Bref at step S126, on the other hand, the program determines no necessity for charging the battery 194 and carries out the processing of steps S140 through S152 shown in the flowchart of FIG. 14. This processing sets the torque command value Tm1* of the first motor MG1 and the torque command value Tm2* of the second motor MG2, in order to enable a braking force to be applied to the ring gear shaft 126 while not charging the battery 194. In the routine of FIG. 14, the control CPU 190 of the controller 180 first reads the revolving speed Nr of the ring gear shaft 126 and the revolving speed Ns of the sun gear shaft 125 at step S140, and calculates a braking energy Pr required for braking by Pr=Tr*×Nr at step S142.

Figure 19:
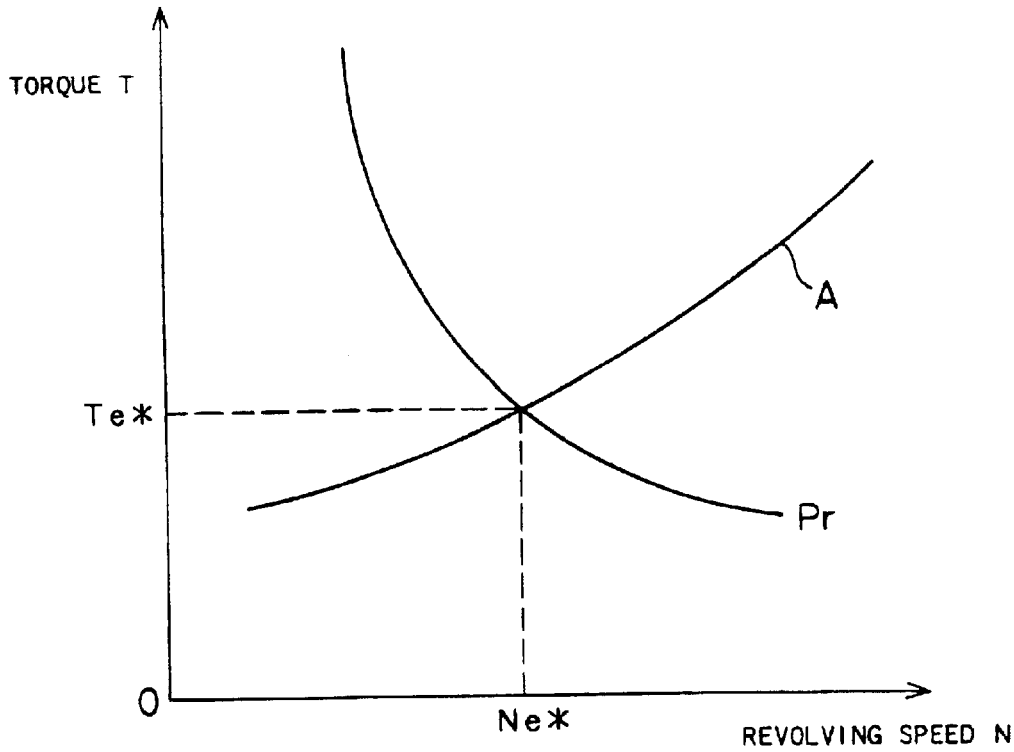
FIG. 19 is a graph showing the relationship between the revolving speed Ne, the torque Te working as a reaction, and the braking energy Pr while the engine 150 is raced.

The control CPU 190 then sets the target torque Te* and the target revolving speed Ne* of the engine 150 based on the calculated braking energy Pr at step S144. The energy consumed by the engine 150 is identical with the product of the torque Te working as a reaction force and the revolving speed Ne of the engine 150. The braking energy Pr and the target torque Tr* and the target revolving speed Ne* of the engine 150 accordingly satisfy the relationship of Pr=Te*×Ne*. As discussed previously with the graph of FIG. 10, the relationship between the revolving speed Ne of the engine 150 and the torque Te working as a reaction force is determined unequivocally. The required operation accordingly fields a specific point at which the product becomes equal to the braking energy Pr and specifies the torque Te and the revolving speed Ne at the specific point as the target torque Te* and the target revolving speed Ne* of the engine 150. By way of example, the specific point can be obtained as an intersection of a curve A representing the relationship between the revolving speed Ne of the engine 150 and the torque Te working as a reaction force and a constant energy curve Pr as shown in the graph of FIG. 19. In this embodiment, the braking energy Pr and the corresponding revolving speed Ne and torque Te of the engine 150 are stored in the form of a map in the ROM 190b. In accordance with a concrete procedure, at step S144, the revolving speed Ne and the torque Te corresponding to the calculated braking energy Pr are read from the map stored in the ROM 190b and set as the target engine speed Ne* and the target engine torque Te*.

The control CPU 190 then calculates the target revolving speed Ns* of the sun gear shaft 125 according to Equation (5) given above at step S146, and calculates and sets the torque command value Tm1* of the first motor MG1 according to Equation (11) given below at step S148. Equation (11) is similar to Equation (6), except that the first term on the right side depends upon the target torque Te* of the engine 150.

$$Tm1^* \leftarrow Te^* \times \frac{\rho}{1+\rho} + K1(Ns^* - Ns) + K2\int (Ns^* - Ns)dt \tag{11}$$

After setting the torque command value Tm1* of the first motor MG1, the control CPU 190 calculates an electrical energy Pm1 consumed or regenerated by the first motor MG1 according to Equation (12) given below at step S150, and calculates and sets the torque command value Tm2* of the second motor MG2 from the calculated electrical energy Pm1 according to Equation (13) given below at step S152. Km1 and Km2 denote motor efficiencies of the first motor MG1 and the second motor MG2.

$$Pm1 \leftarrow Km1 \times Tm1^* \times Ns \tag{12}$$

$$Tm2^* \leftarrow Km2 \times \frac{Pm1}{Nr} \tag{13}$$

The program then returns to step S132 in the flowchart of FIG. 13 to output a signal for stopping the fuel injection into the engine 150 from the communication port to the EFIECU 170 at step S132, and controls the first motor MG1, the second motor MG2, and the engine 150 based on the preset values at steps S134 through S138.

Figure 20:
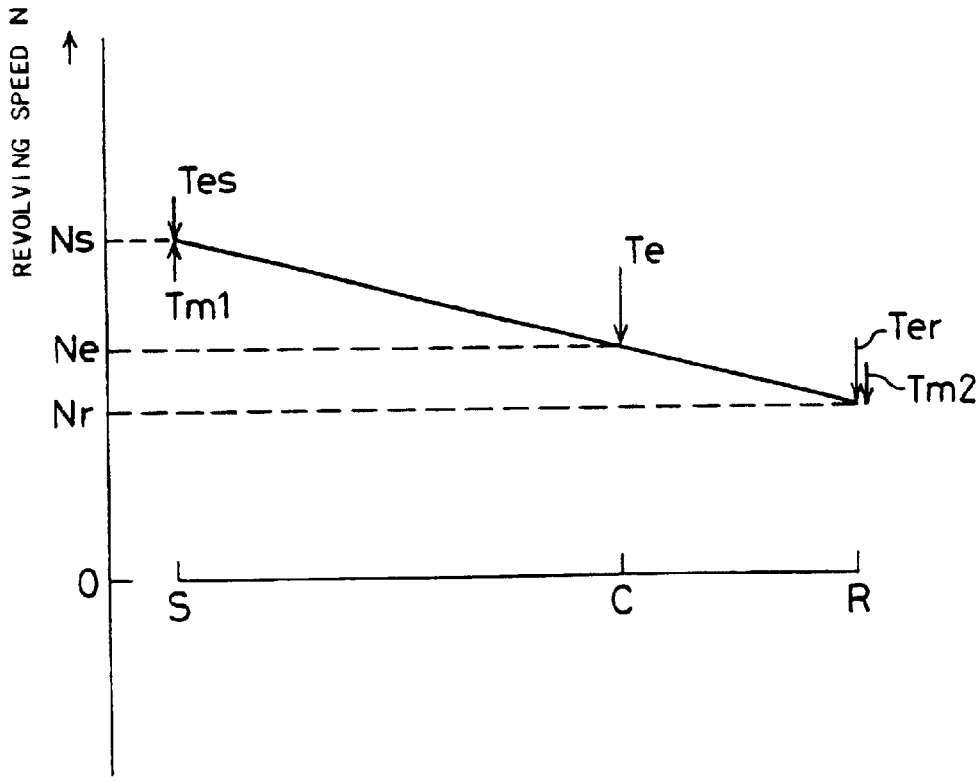
FIG. 20 is a nomogram showing the state when a braking force is applied to the ring gear shaft 126 while the battery 194 is intact in the first embodiment.

As an example of such control, the nomogram of FIG. 20 sows the state when the first motor MG1 is controlled to carry out the power operation. Referring to FIG. 20, the ring gear shaft 126 receives the braking torque Tr* as the sum of the divisional torque Ter based on the torque Te working as a reaction and the torque Tm2 corresponding to the torque command value Tm2* output from the second motor MG2. Although not specifically illustrated, the dynamic collinear line falls into the state shown in the nomogram of FIG. 8 when the first motor MG1 is controlled to carry out the regenerative operation. In case that the first motor MG1 carries out the regenerative operation and the second motor MG2 carries out the power operation, the torque output from the second motor MG2 has the direction opposite to the direction of the torque Tm2 shown in FIG. 20.

When the remaining charge BRM of the battery 194 is not less than the threshold value Bref at step S126 in the flowchart of FIG. 13, the electrical energy Pm1 consumed or regenerated by the first motor MG1 is regenerated or consumed by the second motor MG2. The battery 194 is accordingly neither charged nor discharged. This process enables a desired braking force to be output to the ring gear shaft 126 while neither charging nor discharging the battery 194.

In the torque control routine in the braking state of the embodiment, when the remaining charge BRM of the battery 194 is less than the threshold value Bref at step S126, the program sets the torque command value Tm1* of the first motor MG1 equal to zero, thereby stopping the engine 150 and racing the first motor MG1. In accordance with another possible application, however, the engine 150 may be driven at a desired revolving speed. By way of example, in order to drive the engine 150 at a predetermined revolving speed Nst, the processing of steps S128 and S130 in the torque control routine in the braking state shown in the flowcharts of FIGS. 13 and 14 may be replaced with the processing of steps S180 through S188 in a modified torque control routine in the braking state shown in the flowchart of FIG. 21.

Figure 21:
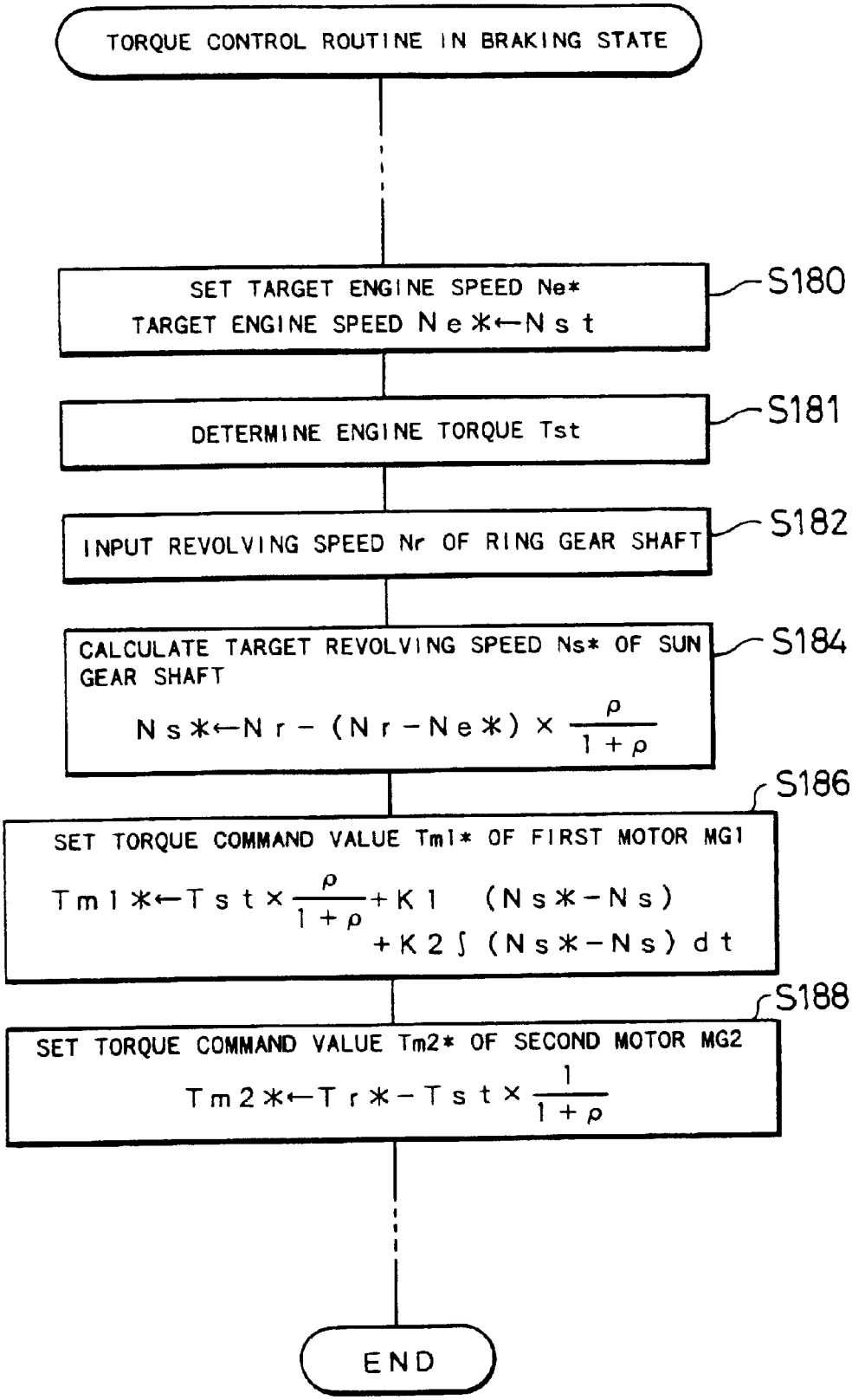
FIG. 21 is a flowchart showing part of a modified torque control routine in a braking state.
Figure 22:
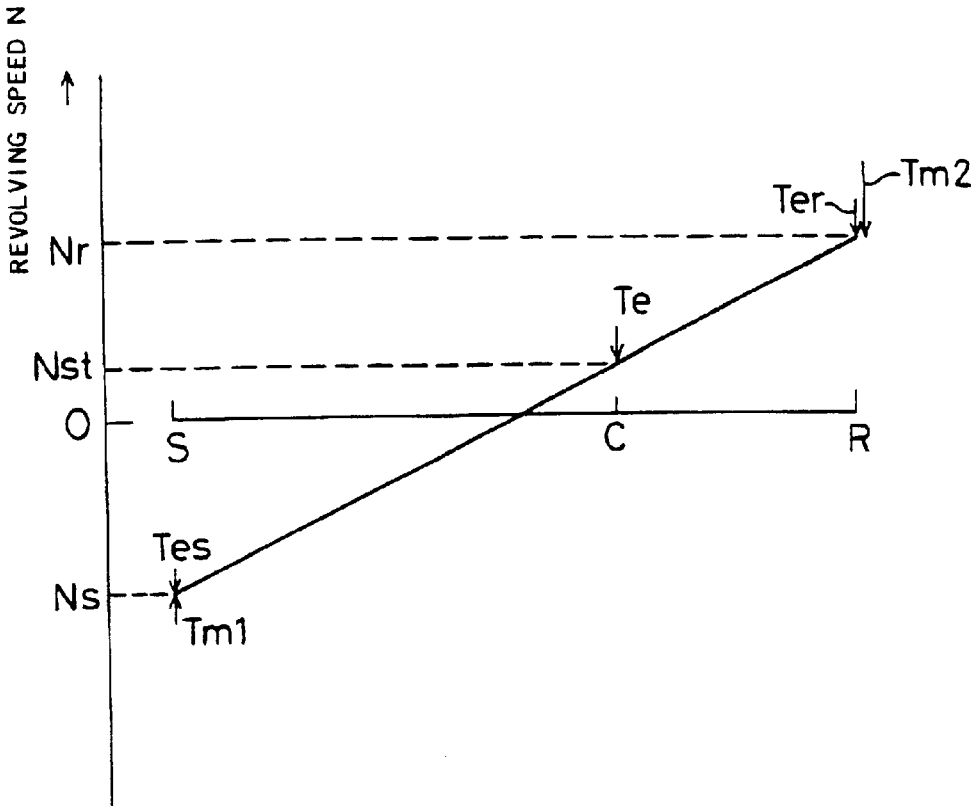
FIG. 22 is a nomogram showing the state when the modified torque control routine in the braking state is carried out.

In the modified torque control routine in the braking state of FIG. 21, the control CPU 190 of the controller 180 sets the predetermined revolving speed Nst to the target revolving speed Ne* of the engine 150 at step S180, and reads a torque Tst working as a reaction force and corresponding to the predetermined revolving speed Nst from the map (for example, the map of FIG. 10) at step S181. The control CPU 190 then reads the revolving speed Nr of the ring gear shaft 126 at step S182 and calculates the target revolving speed Ns* of the sun gear shaft 125 according to Equation (5) given above at step S184. The control CPU 190 subsequently calculates and sets the torque command value Tm1* of the first motor MG1 according to Equation (14) given below at step S186, and calculates and sets the torque command value Tm2* of the second motor MG2 according to Equation (15) given below at step S188. The program then carries out the processing of steps S132 through S138 in the flowchart of FIG. 13. The nomogram of FIG. 22 shows the state when such control is carried out. The control of the first motor MG1 enables the engine 150 to be driven at the predetermined revolving speed Nst.

$$Tm1^* \leftarrow Tst \times \frac{\rho}{1+\rho} + K1(Ns^* - Ns) + K2\int (Ns^* - Ns)dt \tag{14}$$

$$Tm2^* \leftarrow Tr^* - Tst \times \frac{1}{1+\rho} \tag{15}$$

Figure 23:
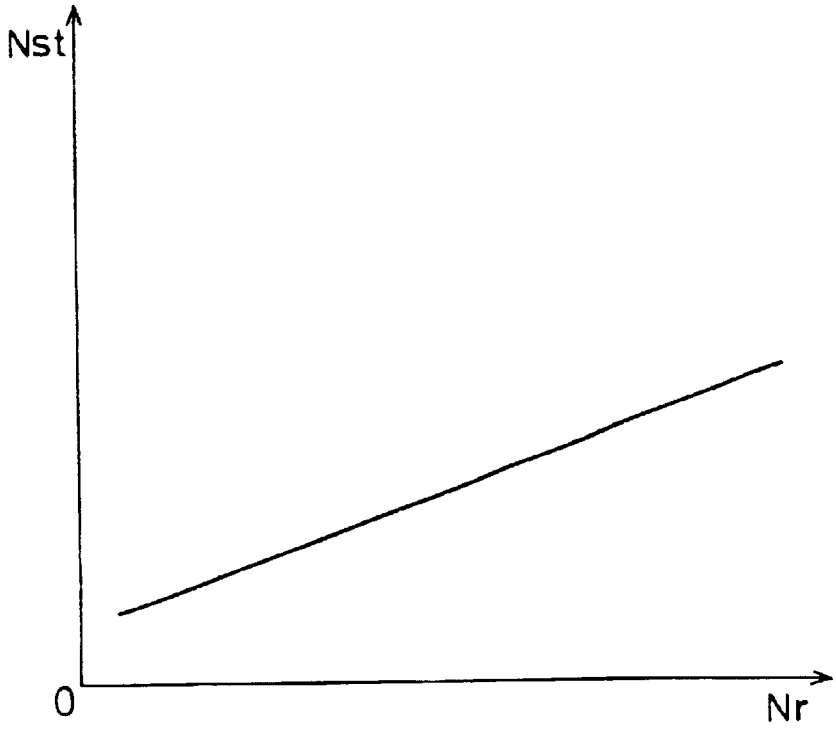
FIG. 23 is a graph showing the relationship between the predetermined revolving speed Nst and the revolving speed Nr of the ring gear shaft 126.

This modified procedure does not stop the operation of the engine 150 but allows the rotation of the engine 150 at the predetermined revolving speed Nst. When the driver steps on the accelerator pedal 164 in the course of the braking control and requires the engine 150 to output the energy Pe corresponding to the step-on amount of the accelerator pedal 164, this modified procedure more quickly realizes the requirement than the procedure of the embodiment. The predetermined revolving speed Nst set to the target revolving speed Ne* of the engine 150 at step S180 may be varied with a variation in revolving speed Nr of the ring gear shaft 126 as shown in the graph of FIG. 23. This further enhances the speed of the procedure of outputting the required energy from the engine 150.

Figure 24:
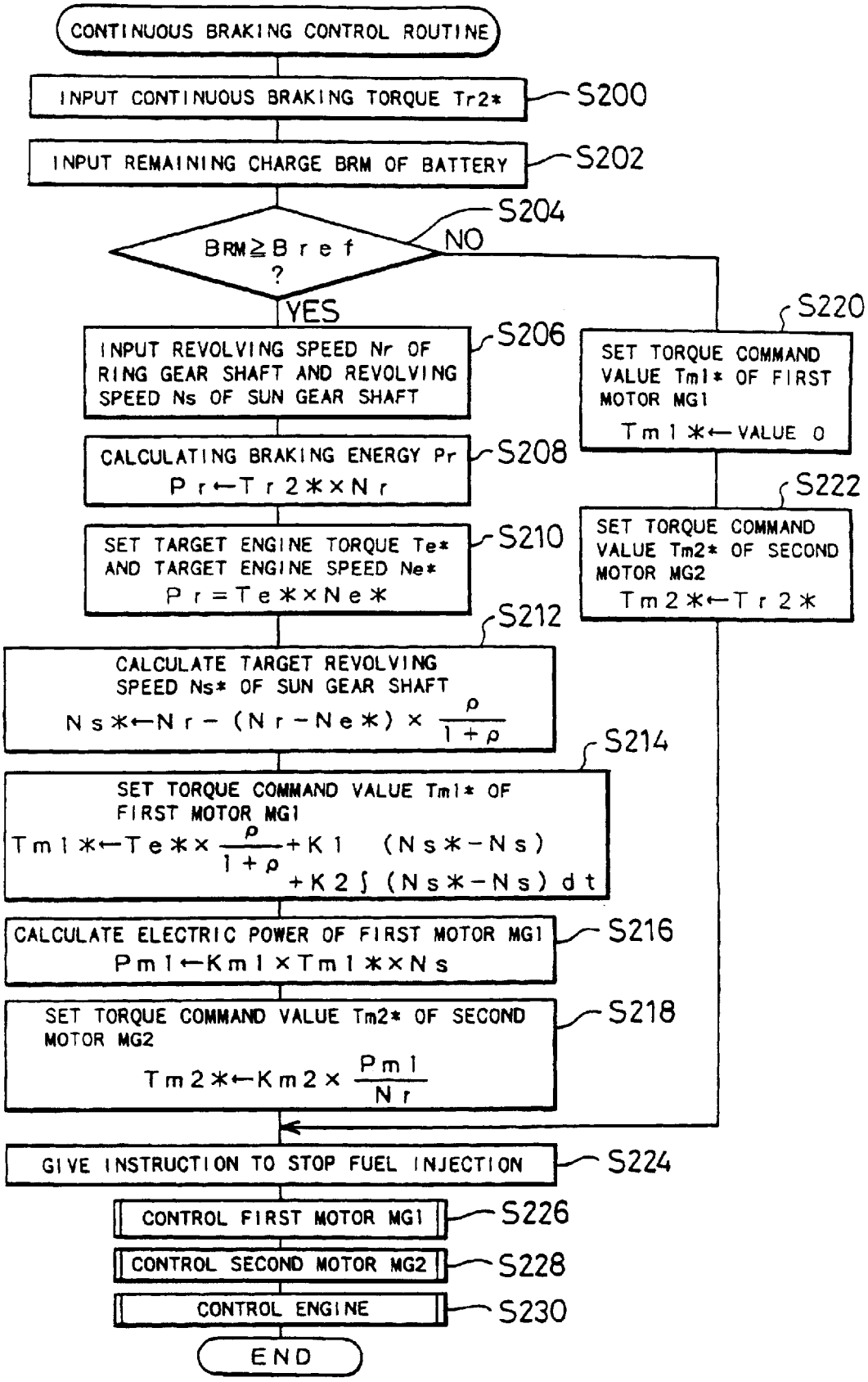
FIG. 24 is a flowchart showing a continuous braking control routine executed by the control CPU 190 of the controller 180 in the first embodiment.

As mentioned above, the operation of applying a braking force to the ring gear 126 irrespective of the step-on of the brake pedal 165 while the vehicle runs down a long, continuous slope, follows a continuous braking control routine shown in the flowchart of FIG. 24. This routine is executed when the driver sets a continuous braking torque Tr2* and steps on neither the accelerator pedal 164 nor the brake pedal 165. The continuous braking torque Tr2* is set through an operation of a switch disposed near the driver's seat. In this embodiment, the continuous braking torque Tr2* can be selected among three different stages.

When the program enters the routine of FIG. 24, the control CPU 190 of the controller 180 first reads the continuous braking torque Tr2* at step S200. The continuous braking torque Tr2* is set through the operation of the switch by the driver and written at a predetermined address in the RAM 190a. In accordance with a concrete procedure, the control CPU 190 reads the data of continuous braking torque Tr2* previously written at the predetermined address at step S200. The control CPU 190 then reads the remaining charge BRM of the battery 194 detected by the remaining charge meter 199 at step S202, and compares the input remaining charge BRM with the threshold value Bref at step S204.

In case that the remaining charge BRM of the battery 194 is not less than the threshold value Bref at step S204, the program determines no necessity for charging the battery 194 and carries out the processing of steps S206 through S218 to set the torque command value Tm1* of the first motor MG1 and the torque command value Tm2* of the second motor MG2, so as to enable the continuous braking torque Tr2* to be output to the ring gear shaft 126 while neither charging nor discharging the battery 194. The processing of steps S206 through S218 is identical with the processing of steps S140 through S152 in the torque control routine in the braking state shown in the flowcharts of FIGS. 13 and 14. The procedure of setting the torque command value Tm1* of the first motor MG1 and the torque command value Tm2* of the second motor MG2 in this manner enables the continuous braking torque Tr2* to be output to the ring gear shaft 126 while the battery 194 is kept intact, as discussed previously with the routine of FIGS. 13 and 14.

In case that the remaining charge BRM of the battery 194 is less than the threshold value Bref at step S204, on the other hand, the program determines the necessity for charging the battery 194 and sets the torque command value Tm1* of the first motor equal to zero at step S220 while setting the continuous braking torque Tr2* to the torque command value Tm2* of the second motor MG2 at step S222. The processing of steps S220 and S222 is equivalent to the processing of steps S128 and S130 in the torque control routine in the braking state shown in the flowcharts of FIGS. 13 and 14. The procedure of setting the torque command value Tm1* of the first motor MG1 and the torque command value Tm2* of the second motor MG2 in this manner enables the continuous braking torque Tr2* to be output to the ring gear shaft 126 while the battery 194 is charged, as discussed previously with the routine of FIGS. 13 and 14.

After setting the torque command value Tm1* of the first motor MG1 and the torque command value Tm2* of the second motor MG2, the program outputs a signal for stopping the fuel injection into the engine 150 to the EFIECU 170 at step S224 and controls the first motor MG1, the second motor MG2, and the engine 150 based on the preset values at steps S226 through S230. The processing of steps S226 through S230 is identical with the processing of steps S134 through S138 in the torque control routine in the braking state shown in the flowcharts of FIGS. 13 and 14.

The continuous braking control routine allows the torque corresponding to the preset continuous braking torque Tr2* to be output to the ring gear shaft 126 even when the driver does not step on the brake pedal 165. The vehicle can accordingly run down a long, continuous slope without requiring the driver to continue stepping on the brake pedal 165.

The continuous braking control routine is carried out while the driver steps on neither the accelerator pedal 164 nor the brake pedal 165. This accordingly does not interfere with the torque control in an accelerating state based on the step-on amount of the accelerator pedal 164 or with the torque control in a braking state based on the step-on amount of the brake pedal 165.

This procedure can realize the braking control while the battery 194 is charged or while the battery 194 is kept intact, according to the remaining charge BRM of the battery 194. This keeps the remaining charge BRM of the battery 194 at the level of the threshold value Bref.

Although the magnitude of the continuous braking torque Tr2* is selected among the three different stages in this embodiment, it may be selected among a greater number of stages or fixed to one stage. In this embodiment, the driver sets the magnitude of the continuous braking torque Tr2*. The continuous braking torque Tr2* may, however, be set based on the revolving speed of the driving wheels 116 and 118, that is, the revolving speed Nr of the ring gear shaft 126, or the rate of change of the revolving speed Nr. The latter structure allows a greater braking torque to be output to the ring gear shaft 126 in case of the greater revolving speed Nr of the ring gear shaft 126 (that is, when the vehicle runs at a high speed) or in case of the greater rate of change of the revolving speed Nr of the ring gear shaft 126 (that is, the greater rate of change of the vehicle speed).

In the continuous braking control routine of the embodiment, the braking control with the charge of the battery 194, which is executed when the remaining charge BRM of the battery 194 is less than the threshold value Bref, sets the torque command value Tm1* of the first motor MG1 equal to zero and stops the operation of the engine 150. As discussed with the modified routine of FIG. 21, however, the revolving speed Ne of the engine 150 may be set equal to the predetermined revolving speed Nst. This structure enables the engine 150 to output the required energy quickly in response to the step-on of the accelerator pedal 164.

In the continuous braking control routine of the embodiment, the braking control without the charge of the battery 194, which is executed when the remaining charge BRM of the battery 194 is not less than the threshold value Bref, controls the first motor MG1 and the second motor MG2 to enable the electrical energy Pm1 regenerated or consumed by the first motor MG1 to be consumed or regenerated by the second motor MG2, thereby allowing the continuous braking torque Tr2* to be output to the ring gear shaft 126. In accordance with another possible application, the braking force may be output to the ring gear shaft 126 while the first motor MG1 is kept in the lock-up state as shown in the nomogram of FIG. 12. In this case, although the preset continuous braking torque Tr2* can not be output to the ring gear shaft 126, the braking torque corresponding to the revolving speed Nr of the ring gear shaft 126 can be output to the ring gear shaft 126.

As discussed above, the power output apparatus 110 of the embodiment enables the braking torque Tr* or the continuous braking torque Tr2* to be output to the ring gear shaft 126 by means of the first motor MG1 and the engine 150 or by means of the first motor MG1, the second motor MG2, and the engine 150. Another possible structure outputs part of the engine 150. Another possible structure outputs part of the braking torque Tr* or the continuous braking torque Tr2* of the ring gear shaft 126 by means of a mechanical friction brake while outputting the residual torque by means of the first motor MG1, the second motor MG2, and the engine 150.

Figure 25:
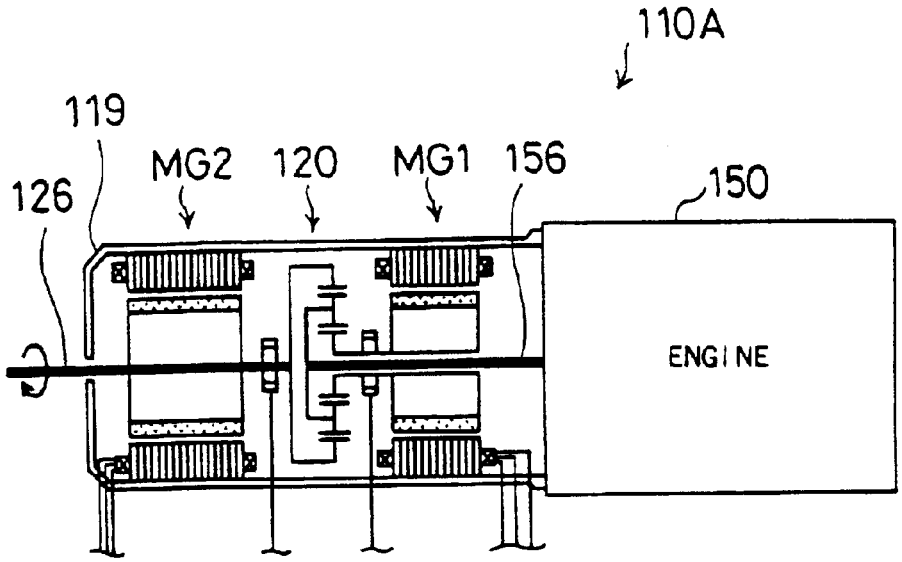
FIG. 25 schematically illustrates another power output apparatus 110A as a modified example of the first embodiment.
Figure 26:
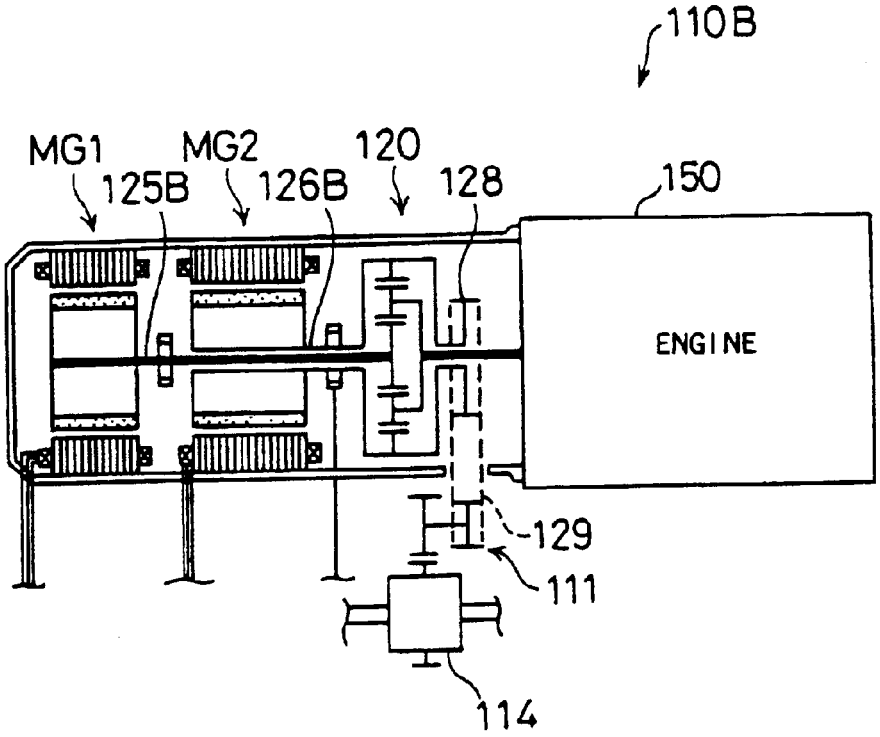
FIG. 26 schematically illustrates still another power output apparatus 110B as another modified example of the first embodiment.

In the power output apparatus 110 of the embodiment, the power output to the ring gear shaft 126 is taken out of the arrangement between the first motor MG1 and the second motor MG2 via the power feed gear 128 linked with the ring gear 122. Like another power output apparatus 110A shown in FIG. 25 as a modified example, however, the power may be taken out of the casing 119, from which the ring gear shaft 126 is extended. FIG. 26 shows still another power output apparatus 110B as another modified example, wherein the engine 150, the planetary gear 120, the second motor MG2, and the first motor MG1 are arranged in this sequence. In this case, a sun gear shaft 125B may not have a hollow structure, whereas a hollow ring gear shaft 126B is required. This modified structure enables the power output to the ring gear shaft 126B to be taken out of the arrangement between the engine 150 and the second motor MG2.

Figure 27:
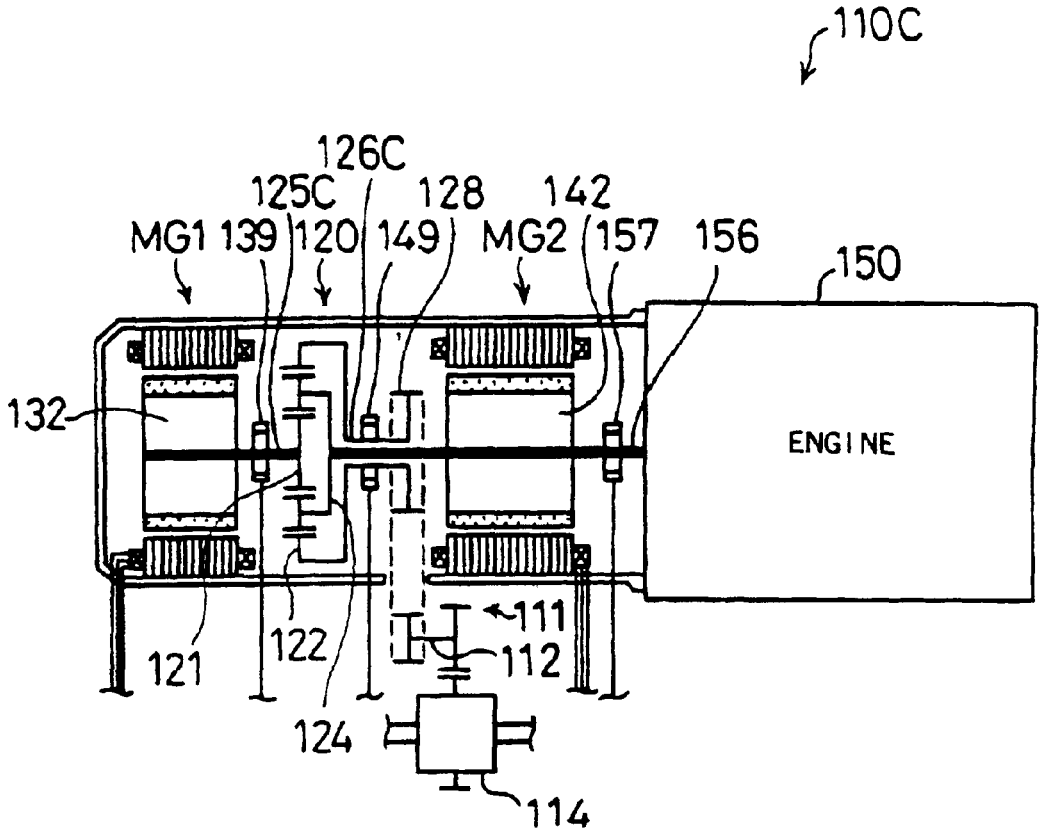
FIG. 27 schematically illustrates structure of an essential part of another power output apparatus 110C as a second embodiment according to the present invention.

The following describes another power output apparatus 110C as a second embodiment according to the present invention. FIG. 27 schematically illustrates structure of an essential part of the power output apparatus 110C of the second embodiment. Referring to FIG. 27, the power output apparatus 110C of the second embodiment has a similar structure to that of the power output apparatus 110 of the first embodiment, except that the rotor 142 of the second motor MG2 is attached to the crankshaft 156 and that the first motor MG1 and the second motor MG2 have a different configuration. The same constitutes as those of the power output apparatus 110 of the first embodiment shown in FIG. 1, such as the controller 180, are omitted from the drawing of FIG. 27. The power output apparatus 110C of the second embodiment can also be mounted on the vehicle as shown in the drawing of FIG. 3. The same constitutes in the power output apparatus 110C of the second embodiment as those in the power output apparatus 110 of the first embodiment are shown by like numerals and symbols and not specifically described here. The symbols used in the description of the first embodiment have the same meanings in the description of the second embodiment, unless otherwise specified.

In the power output apparatus 110C of the second embodiment, the engine 150, the second motor MG2, the planetary gear 120, and the first motor MG1 are arranged in this sequence as shown in FIG. 27. The rotor 132 of the first motor MG1 is attached to a sun gear shaft 125C, which connects with the sun gear 121 of the planetary gear 120, whereas the planetary carrier 124 is linked with the crankshaft 156 of the engine 150 like the power output apparatus 110 of the first embodiment. The rotor 142 of the second motor MG2 and a resolver 157 for measuring a rotational angle θe of the crankshaft 156 are further attached to the crankshaft 156. A ring gear shaft 126C, which connects with the ring gear 122 of the planetary gear 120, is linked with the power feed gear 128. A resolver 149 for measuring a rotational angle θr of the ring gear shaft 126C is attached to the ring gear shaft 126C.

The power output apparatus 110C of the second embodiment has a different configuration from that of the power output apparatus 110 of the first embodiment. Like the power output apparatus 110 of the first embodiment, however, the three-phase coils 134 of the first motor MG1 is connected to the first driving circuit 191 of the controller 180, and the three-phase coils 144 of the second motor MG2 to the second driving circuit 192. Although not specifically illustrated, the resolver 157 is connected to the input port of the control CPU 190 of the controller 180 through a signal line.

Figure 28:
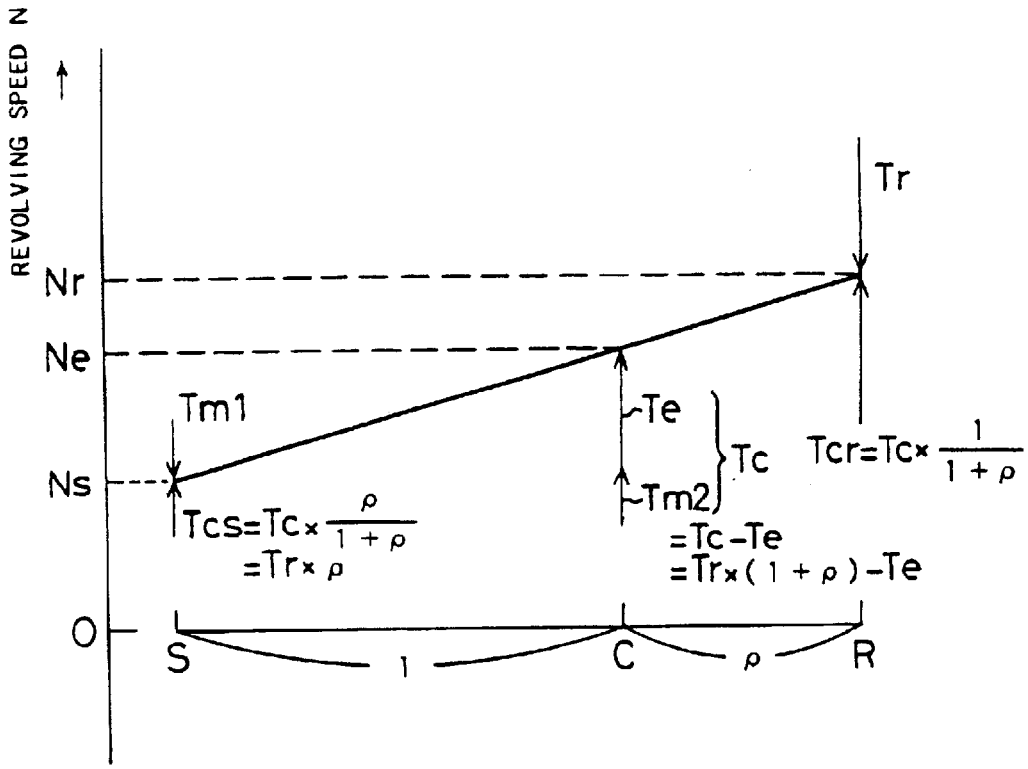
FIG. 28 is a nomogram showing the relationship between the revolving speed and the torque on the three shafts linked with the planetary gear 120 in the power output apparatus 110C of the second embodiment.
Figure 29:
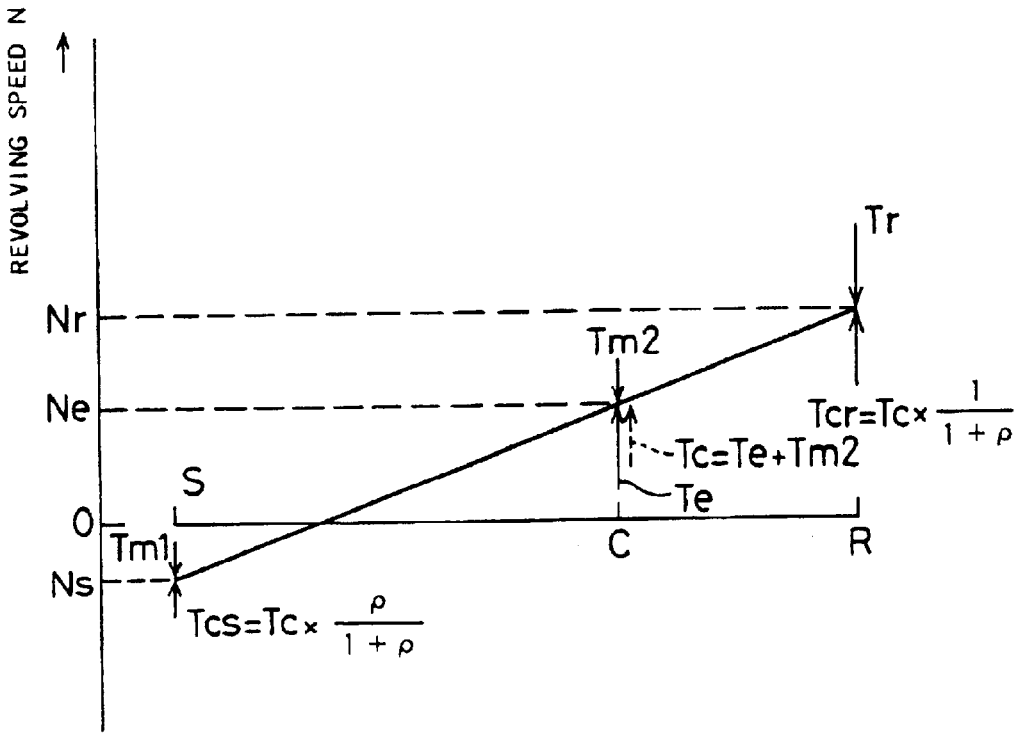
FIG. 29 is a nomogram showing the relationship between the revolving speed and the torque on the three shafts linked with the planetary gear 120 in the power output apparatus 110C of the second embodiment.

The power output apparatus 110C of the second embodiment works in the following manner. By way of example, it is assumed that the engine 150 is driven at a driving point P1 of the resolving speed Ne and the torque Te and outputs an amount of energy Pe (pe=Ne×Te) and that the ring gear shaft 126C is driven at another driving point P2 of the revolving speed Nr and the torque Tr and outputs an amount of energy Pr (Pr=Nr×Tr) identical with the energy Pe. This means that the power output from the engine 150 is subjected to the torque conversion and applied to the ring gear shaft 126C. FIGS. 28 and 29 are nomograms in this state.

Equations (16) through (19) given below are obtained from the equilibrium on the dynamic collinear line in the nomogram of FIG. 28. Equation (16) is obtained from the equilibrium of the energy Pe output form the engine 150 with the energy Pr output to the ring gear shaft 126C, and Equation (17) as the total energy input to the planetary carrier 124 via the crankshaft 156. Equations (18) and (19) are led by dividing a torque Tc acting on the planetary carrier 124 into divisional torques Tcs an Tcr acting on the coordinate axes S and R.

$$Te \times Ne = Tr \times Nr \tag{16}$$

$$Tc = Te + Tm2 \tag{17}$$

$$Tcs = Tc \times \frac{\rho}{1+\rho} \tag{18}$$

$$Tcr = Tc \times \frac{1}{1+\rho} \tag{19}$$

The equilibrium of forces on the dynamic collinear line is essential for the stable state of the dynamic collinear line. It is accordingly required to set the torque Tm1 equal to the divisional torque Tcs and the torque Tr equal to the divisional torque Tcr. The torques Tm1 and Tm2 are thus expressed by Equations (20) and (21) given below:

$$Tm1 = Tr \times \rho \tag{20}$$

$$Tm2 = Tm(1+\rho) - Tc \tag{21}$$

The power output from the engine 150 and defined by the torque Te and the revolving speed Ne is converted to the power defined by the torque Tr and the revolving speed Nr and output to the ring gear shaft 126C by allowing the first motor MG1 to apply the torque Tm1 expressed by Equation (20) to the sun gear shaft 125C and allowing the second motor MG2 to apply the torque Tm2 expressed by Equation (21) to the crankshaft 156. In the state of the nomogram of FIG. 28, the direction of the torque output from the first motor MG1 is opposite to the direction of the rotation of the rotor 132. The first motor MG1 accordingly functions as a generator and regenerates the electrical energy Pm1 expressed as the product of the torque Tm1 and the revolving speed Ns. The direction of the torque output from the second motor MG2 is, on the other hand, identical with the direction of the rotation of the rotor 142. The second motor MG2 accordingly functions as a motor and consumes the electrical energy Pm2 expressed as the product of the torque Tm2 and the revolving speed Nr.

Although the revolving speed Ns of the sun gear shaft 125C is positive in the nomogram of FIG. 28, it may be negative according to the revolving speed Ne of the engine 150 and the revolving speed Nr of the ring gear shaft 126C as shown in the nomogram of FIG. 29. In the latter case, the first motor MG1 applies the torque in the direction of rotation of the rotor 132 and thereby works as a motor to consume the electrical energy Pm1 given as the product of the torque Tm1 and the revolving speed ns. The second motor MG2, on the other hand, applies the torque in reverse of the rotation of the rotor 142 and thereby works as a generator to regenerate the electrical energy Pm2, which is given as the product of the torque Tm2 and the revolving speed Nr, from the ring gear shaft 126C.

Like the operation principle of the power output apparatus 110 of the first embodiment, the operation principle of the second embodiment is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', and it is required to make the energy Pe output from the engine 150 a little greater than the energy Pr output to the ring gear shaft 126C or alternatively to make the energy Pr output to the ring gear shaft 126C a little smaller than the energy Pe output from the engine 150. As discussed previously, the energy loss due to the mechanical friction in the planetary gear 120 is significantly small and the synchronous motors used as the motors MG1 and MG2 have the efficiency very close to the value '1', so that the efficiency of power conversion is practically equal to the value '1'. For the matter of convenience, in the following discussion of the second embodiment, the efficiency is thus considered equal to the value '1' (=100%), unless otherwise specified.

The braking control by the first motor MG1 and the engine 150 carried out in the power output apparatus 110 of the first embodiment is applicable to the power output apparatus 110C of the second embodiment, provided that the second motor MG2 is not driven. The first motor MG1 is accordingly controlled to carry out the regenerative operation or the power operation and enables a braking force to be output to the ring gear shaft 126C. The braking control by the first motor MG1 and the engine 150 has been discussed in detail with the drawings of FIGS. 7 through 12, and is not specifically described here. The following describes the braking control by the first motor MG1, the second motor MG2, and the engine 150 carried out in the power output apparatus 110C of the second embodiment. Since the second motor MG2 is not attached to the ring gear shaft 126C, the power output apparatus 110C of the second embodiment can not carry out the braking control by the second motor MG2.

In the braking control by the first motor MG1 and the engine 150 carried out in the power output apparatus 110 of the first embodiment, the torque Tc acting as a reaction force is determined corresponding to the preset revolving speed Ne of the engine 150 in the graph of FIG. 10. The braking torque that can be output to the ring gear shaft 126 thus depends upon the revolving speed Ne of the engine 150. Namely the structure of the first embodiment can not increase or decrease the braking force output to the ring gear shaft 126 while keeping the revolving speed Ne of the engine 150 unchanged. In the power output apparatus 110C of the second embodiment, on the other hand, the second motor MG2 is attached to the crankshaft 156 of the engine 150 and can output the torque to the crankshaft 156, thereby enabling the braking force output to the ring gear shaft 126C to increase or decrease while keeping the revolving speed Ne of the engine 150 unchanged. The revolving speed of the engine 150 in the braking state can be set to a desired level through the control of the second motor MG2. In the second embodiment, the braking control by the first motor MG1, the second motor MG2, and the engine 150 follows a torque control routine in a braking state shown in the flowcharts of FIGS. 30 and 31 and a continuous braking control routine shown in the flowchart of FIG. 34.

Figure 30:
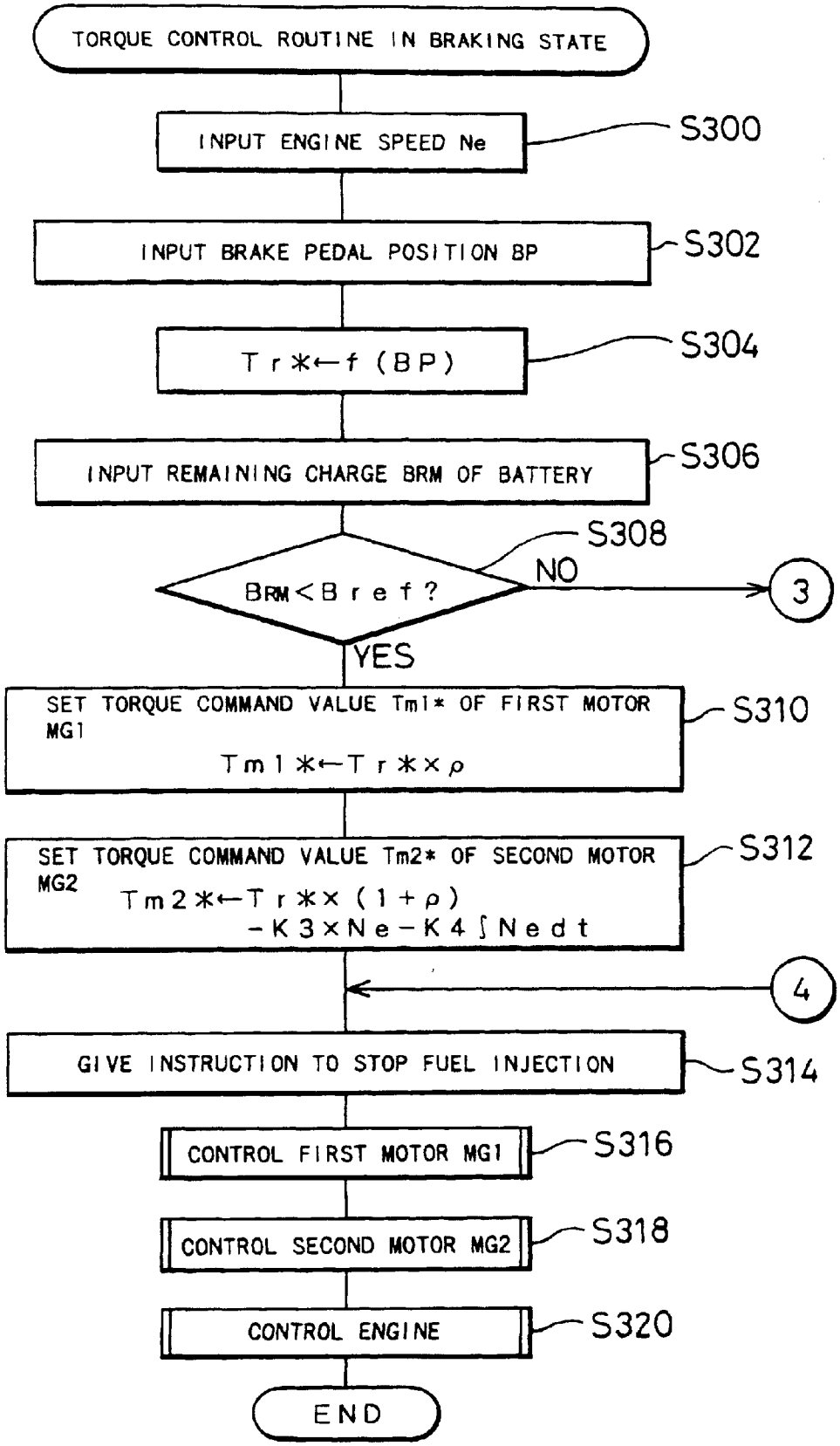
FIGS. 30 and 31 are flowcharts showing a torque control routine in a braking state executed by the control CPU 190 of the controller 180 in the second embodiment.
Figure 31:
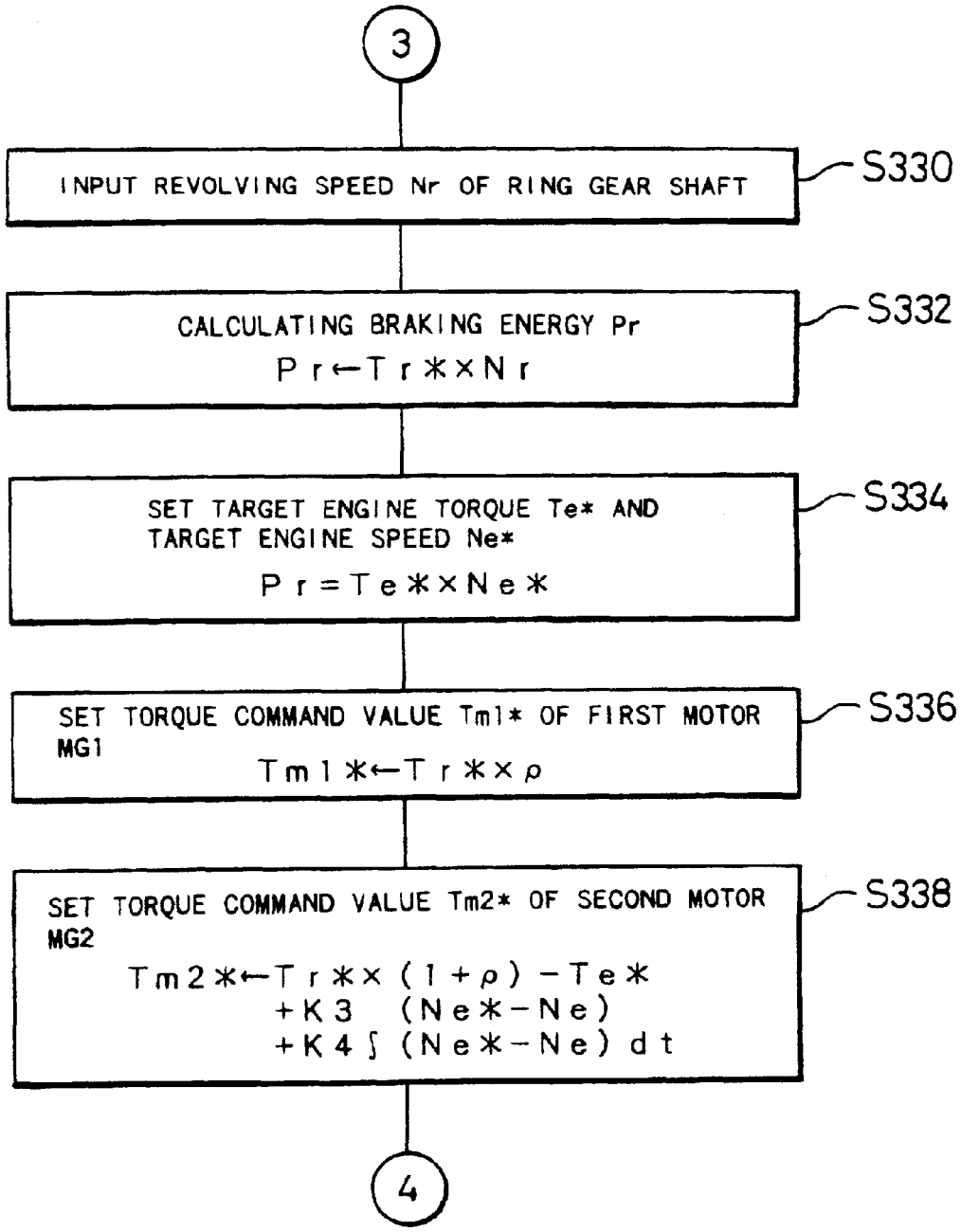

The torque control routine in the breaking state shown in the flowcharts of FIGS. 30 and 31 is executed repeatedly at predetermined time intervals (for example, at every 8 msec) while the vehicle runs. When the program enters the routine of FIG. 30, the control CPU 190 of the controller 180 first reads the revolving speed Ne of the engine 150 at step S300. The revolving speed Ne of the engine 150 may be calculated from the rotational angle θc of the crankshaft 156 measured by the resolver 157. Alternatively the revolving speed Ne of the engine 150 may be measured directly with the speed sensor 176 attached to the distributor 160. In the latter case, the control CPU 190 receives data of the revolving speed Ne from the EFIECU 170 connected to the speed sensor 176 through communication.

The control CPU 190 then reads the brake pedal position BP detected by the brake pedal position sensor 165a at step S302, and determines the braking torque Tr* to be output to the ring gear shaft 126C, based on the input brake pedal position BP at step S304. The procedure of determining the braking torque Tr* is identical with that explained in the first embodiment. The control CPU 190 subsequently reads the remaining charge BRM of the battery 194 measured by the remaining charge member 199 at step S306, and compares the input remaining charge BRM of the battery 194 with the threshold value Bref at step S308.

In case that the remaining charge BRM of the battery 194 is less than the threshold value Bref at step S308, the program determines the necessity for charging the battery 194 and sets a calculated value according to the equation of Tm1*=Tr*×ρ to the torque command value Tm1* of the first motor MG1 at step S310 while setting a calculated value according to Equation (22) given below to the torque command value Tm2* of the second motor MG2 at step S312. The first term on the right side of Equation (22) is obtained from the equilibrium on the dynamic collinear line shown in the nomograms of FIGS. 28 and 29. The second term on the right side is a proportional term to cancel the deviation of the revolving speed Ne of the engine 150 from the value '0', and the third term on the right side is an integral term to cancel the stationary deviation. In the stationary state (that is, when the revolving speed Ne of the engine 150 is equal to zero), the torque command value Tm2* of the second motor MG2 is set equal to the first term on the right sides Tr*×(1+ρ) obtained from the equilibrium on the dynamic collinear line. K3 and K4 in Equation (22) denote proportional constants.

$$Tm2^*=Tr^*\times(1+\rho)=K3\times Ne-K4\int Ne\,dt \quad (22)$$

The control CPU 190 then outputs a signal for stopping the fuel injection into the engine 150 from the communication port to the EFIECU 170 at step S314 and controls the first motor MG1, the second motor MG2, and the engine 150 based on the preset values at steps S316 through S320. Like the first embodiment, although the control operations of the first motor MG1, the second motor MG2, and the engine 150 are shown as separate steps for convenience in the second embodiment, these control operations in the actual state are carried out in parallel and comprehensively. The control procedures of the first motor MG1, the second motor MG2, and the engine 150, a step S316 through S320 in the routine of FIG. 30 of the second embodiment are identical with those at steps S134 through S138 in the torque control routine in the braking state of the first embodiment shown in the flowchart of FIGS. 13 and 14, and thus not specifically described here.

Figure 32:
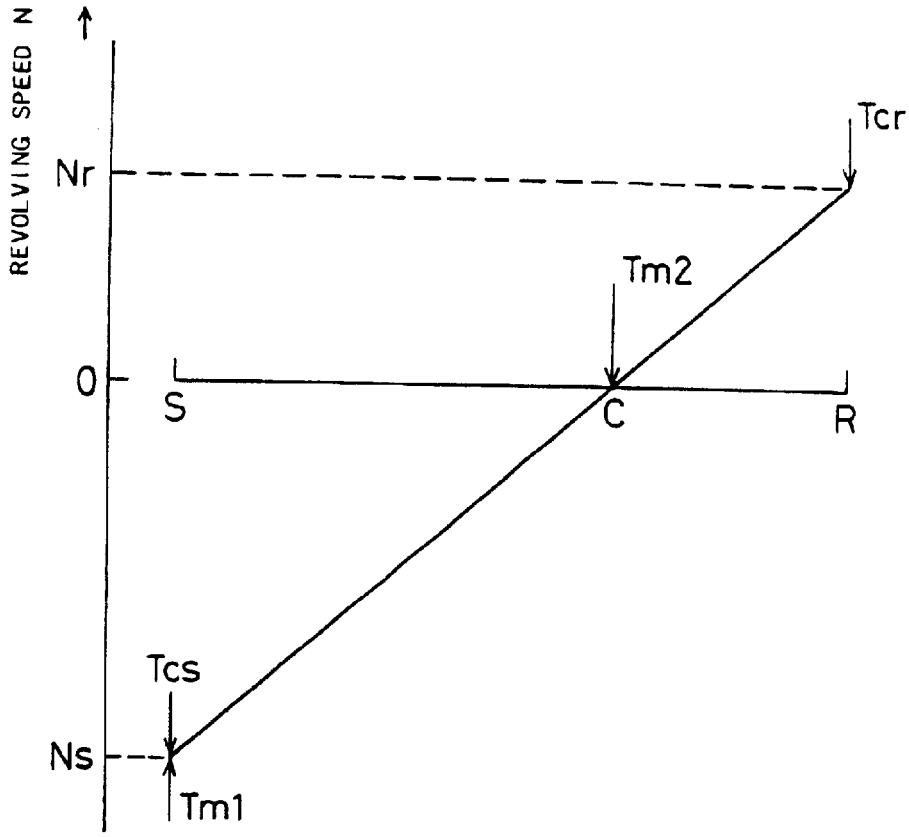
FIG. 32 is a nomogram showing the state when a braking force is applied to the ring gear shaft 126 while the battery 194 is charged in the second embodiment.

When the remaining charge BRM of the battery 194 is determined to be less than the threshold value Bref at step S308, the control procedure enables the dynamic collinear line to fall into the state in which the engine 150 is at a stop, as shown in the nomogram of FIG. 32. In this state, while the second motor MG2 outputs the torque Tm2, the revolving speed Ne of the engine 150 is equal to zero. The energy consumed by the second motor MG2 accordingly gives a minimum value. Most of the energy generated by the braking operation can thus be regenerated by the first motor MG1 as the electrical energy, with which the battery 194 is charged. As clearly understood from the nomogram of FIG. 32, the process of locking up the second motor MG2 may substitute for the process of setting the torque command value Tm2* of the second motor MG2 at step S312.

In case that the remaining charge BRM of the battery 194 is not less than the threshold value Bref at step S308, on the other hand, the program determines no necessity for charging the battery 194 and carries out the processing of steps S330 through S338 shown in the flowchart of FIG. 31. This processing sets the torque command value Tm1* of the first motor MG1 and the torque command value Tm2* of the second motor MG2, in order to enable a braking force to be applied to the ring gear shaft 126C while not charging the battery 194. In the routine of FIG. 31, the control CPU 190 of the controller 180 first reads the revolving speed Nr of the ring gear shaft 126C at step S330, and calculates a braking energy Pr required for braking by Pr=Tr*×Nr at step S332.

The control CPU 190 then sets the target torque Te* and the target revolving speed Ne* of the engine 150 based on the calculated braking energy Pr at step S334. The relationship between the calculated braking energy Pr and the revolving speed Ne and the torque Te of the engine 150 and the technique of determining the target engine speed Ne* and the target engine torque Te* are discussed previously at Step S144 in the torque control routine in the braking state of the first embodiment shown in the flowcharts of FIGS. 13 and 14.

The control CPU 190 subsequently sets a calculated value according to the equation of Tm1*=Tr*×ρ to the torque command value Tm1* of the first motor MG1 at step S336 while setting a calculated value according to Equation (23) given below to the torque command value Tm2* of the second motor MG2 at step S338. The first and the second terms on the right side of Equation (23) are obtained from the equilibrium on the dynamic collinear line shown in the nomogram of FIG. 33. The third term on the right side is a proportional term to cancel the deviation of the revolving speed Ne of the engine 150 from the target engine speed Ne*, and the fourth term on the right side is an integral term to cancel the stationary deviation. The nomogram of FIG. 33 shows the target driving state when the first motor MG1, the second motor MG2, and the engine 150 are controlled after the processing of steps S330 through S338.

$$Tm2^* \leftarrow Tr^* x(1+\rho) - Te^* + K3(Ne^* - Ne) + K4\int(Ne^* - Ne)dt \quad (23)$$

The control CPU 190 then outputs a signal for stopping the fuel injection into the engine 150 from the communication port to the EFIECU 170 at step S314 and controls the first motor MG1, the second motor MG2, and the engine 150 based on the preset values at steps S316 through S320.

Figure 33:
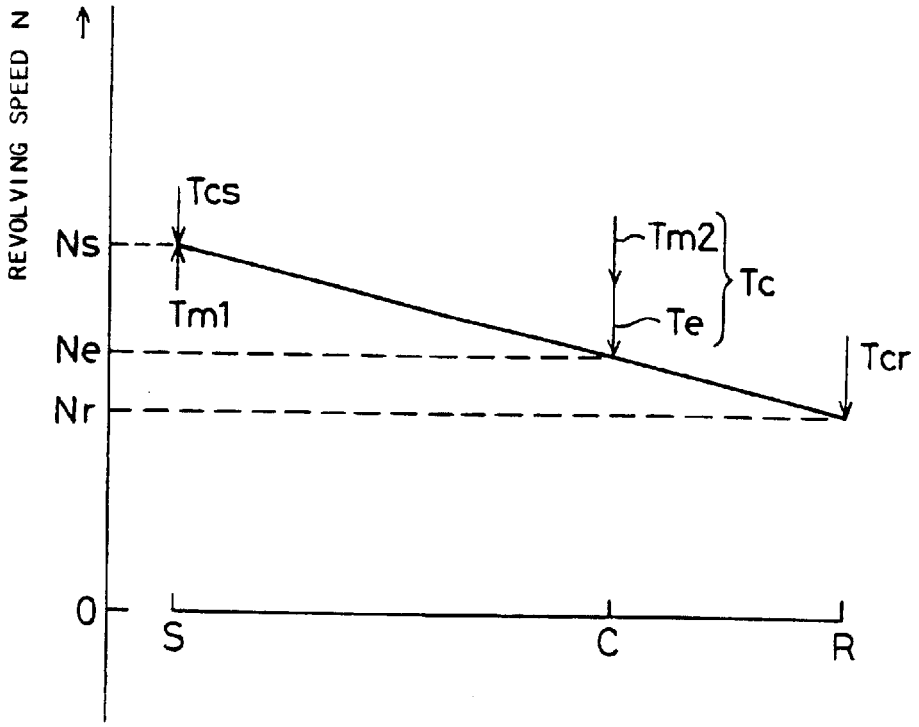
FIG. 33 is a nomogram showing the state when a braking force is applied to the ring gear shaft 126 while the battery 194 is intact in the second embodiment.

The control procedure enables a divisional torque Ter (braking torque Tr*) based on the torque Tc, which is the sum of the torque Te working as a reaction and the torque Tm2 corresponding to the torque command value Tm2* output from the second motor MG2, to be applied to the ring gear shaft 126C, as shown in the nomogram of FIG. 33. In the state of the nomogram of FIG. 33, the revolving speed Ns of the sun gear shaft 125C is positive. The first motor MG1 is accordingly controlled to carry out the power operation, whereas the second motor MG2 is controlled to regenerate the electrical energy Pm1 that is consumed by the first motor MG1. When the revolving speed Ns of the sun gear shaft 125C is negative, on the contrary, the first motor MG1 carries out the regenerative operation and the second motor MG2 carries out the power operation to consume the electrical energy Pm1 that is regenerated by the first motor MG1.

When the remaining charge BRM of the battery 194 is determined to be not less than the threshold value Bref at step S308, the second motor MG2 regenerative or consumes the electrical energy Pm1 that is consumed or regenerated by the first motor MG1. The battery 194 is thus neither charged nor discharged. This procedure enables a desired braking force to be output to the ring gear shaft 126C while neither charging nor discharging the battery 194.

In the torque control routine in the braking surface of the second embodiment, when the remaining charge BRM of the battery 194 is less than the threshold value Bref at step S308, the first motor MG1 and the second motor MG2 are controlled to make the revolving speed Ne of the engine 150 equal to zero. Another possible procedure may, however, control the first motor MG1 and the second motor MG2 to allow the engine 150 to be driven at a desired revolving speed. In this case, the revolving speed Ne of the engine 150 is controlled to a predetermined value by regulating the revolving speed Ns of the sun gear shaft 125C. For that purpose, the processing of steps S180 through S188 in the modified torque control routine in the braking state shown in the flowchart of FIG. 21 is applied to the structure of the second embodiment, in which the second motor MG2 is attached to the crankshaft 156. The modified procedure does not stop the operation of the engine 150 but allows the rotation of the engine 150 at a predetermined revolving speed. When the driver steps on the accelerator pedal 164 in the course of the braking control, this modified structure enables the required energy to be output from the engine 150 without delay.

Figure 34:
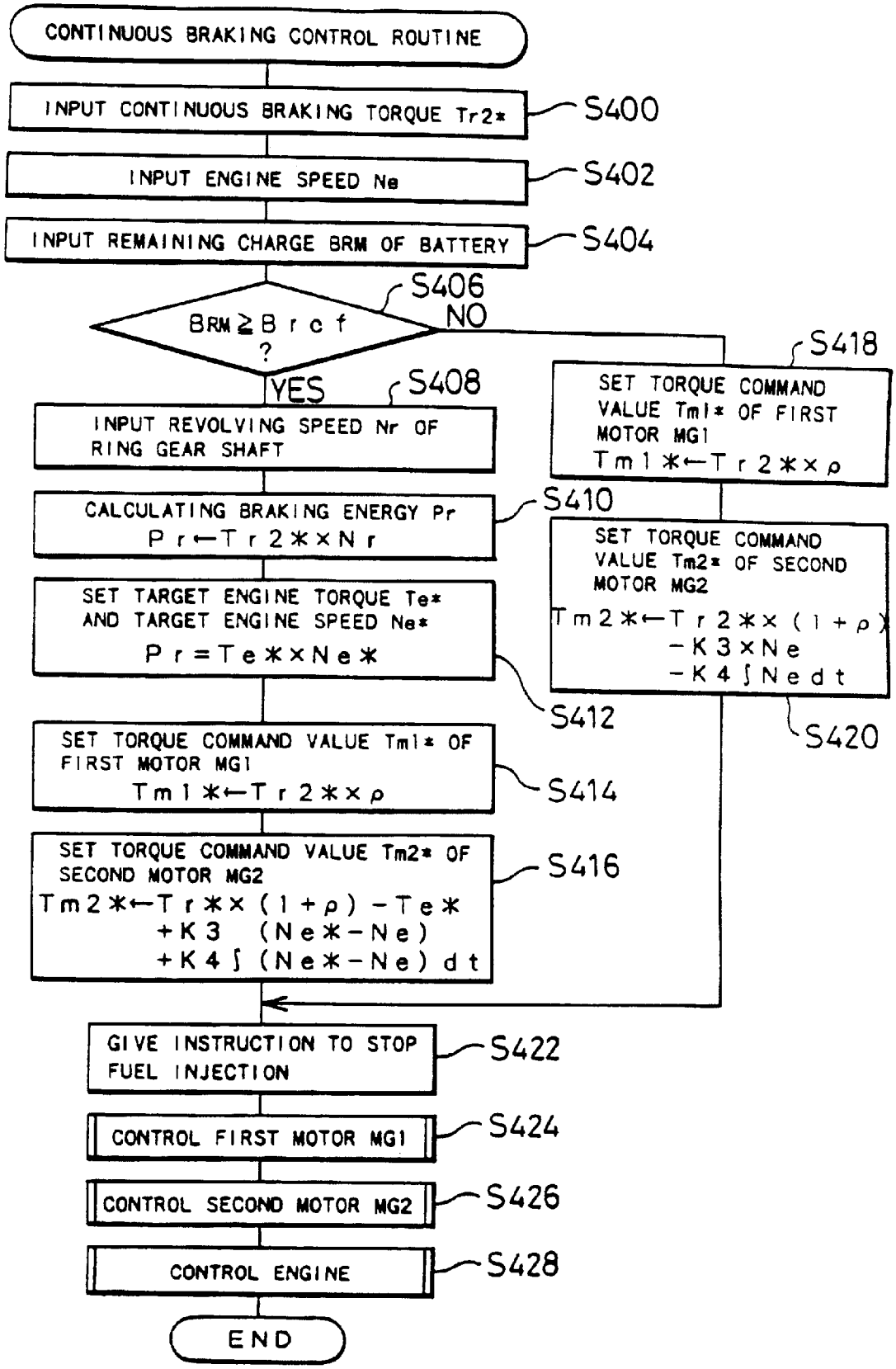
FIG. 34 is a flowchart showing a continuous braking control routine executed by the control CPU 190 of the controller 180 in the second embodiment.

The operation of applying a braking force to the ring gear shaft 126C irrespective of the step-on of the brake pedal 165 while the vehicle runs down a long, continuous slope, follows a continuous braking control routine shown in the flowchart of FIG. 34. Like the continuous braking control routine of the first embodiment shown in the flowchart of FIG. 24, this routine is executed when the driver sets a continuous braking torque Tr2* and steps on neither the accelerator pedal 164 nor the brake pedal 165. The continuous braking torque Tr2* is set through an operation of a switch disposed near the driver's seat. In the second embodiment, the continuous braking torque Tr2* can be selected among three different stages.

When the program enters the routine of FIG. 34, the control CPU 190 of the controller 180 first reads the continuous braking torque Er2* at step S400, and receives the data of receiving speed Ne of the engine 150 at step S402. The continuous braking torque Tr2* is input in the same manner as the first embodiment. The control CPU 190 then reads the remaining charge BRM of the battery 194 detected by the remaining charge meter 199 at step S404, and compares the input remaining charge BRM with the threshold value Bref at step S406.

In case that the remaining charge BRM of the battery 194 is not less than the threshold value Bref at step S406, the program determines no necessity for charging the battery 194 and carries out the processing of steps S408 through S416 to set the torque command value Tm1* of the first motor MG1 and the torque command value Tm2* of the second motor MG2, so as to enable the continuous braking torque Tr2* to be output to the ring gear shaft 126C while neither charging nor discharging the battery 194. The processing of steps S408 through S416 is identical with the processing of steps S330 through S338 in the torque control routine in the braking state shown in the flowcharts of FIGS. 30 and 31. The procedure of setting the torque command value Tm1* of the first motor MG1 and the torque command value Tm2* of the second motor MG2 in this manner enables the continuous braking torque Tr2* to be output to the ring gear shaft 126C while the battery 194 is kept intact, as discussed previously.

In case that the remaining charge BRM of the battery 194 is less than the threshold value Bref at step S406, on the other hand, the program determines the necessity for charging the battery 194 and sets a calculated value according to the equation of $Tm1^* = Tr2^* \times \rho$ to the torque command value Tm1* of the first motor MG1 at step S418 while setting a calculated value according to Equation (22) to the torque command value Tm2* of the second motor MG2 at step S420. The processing of steps S418 and S420 is equivalent to the processing of steps S310 and S312 in the torque control routine in the braking state shown in the flowcharts of FIGS. 30 and 31. As discussed previously, the procedure of setting the torque command value Tm1* of the first motor MG1 and the torque command value Tm2* of the second motor MG2 in this manner enables the continuous braking torque Tr2* to be output to the ring gear shaft 126C while the battery 194 is charged.

After setting the torque command value Tm1* of the first motor MG1 and the torque command value Tm2* of the second motor MG2, the program outputs a signal for stopping the fuel injection into the engine 150 to the EFIECU 170 at step S422 and controls the first motor MG1, the second motor MG2, and the engine 150 based on the preset values at steps S424 through S428. The processing of steps S424 through S428 is identical with the processing of steps S134 through S138 in the torque control routine in the braking state of the first embodiment shown in the flowcharts of FIGS. 13 and 14.

The continuous braking control routine of the second embodiment allows the torque corresponding to the preset continuous braking torque Tr2* to be output to the ring gear shaft 126C even when the driver does not step on the brake pedal 165. The vehicle can accordingly run down a long, continuous slope without requiring the driver to continue stepping on the brake pedal 165. The continuous braking control routine is carried out while the driver steps on neither the accelerator pedal 164 nor the brake pedal 165. This accordingly does not interfere with the torque control in an accelerating state based on the step-on amount of the accelerator pedal 164 or with the torque control in a braking state based on the step-on amount of the brake pedal 165.

This procedure can realize the braking control while the battery 194 is charged or while the battery 194 is kept intact, according to the remaining charge BRM of the battery 194. This keeps the remaining charge BRM of the battery 194 at the level of the threshold value Bref.

Like the first embodiment, although the magnitude of the continuous braking torque Tr2* is selected among the three different stages in the second embodiment, it may be selected among a greater number of stages or fixed to one stage. The continuous brake torque Tr2* may be set based on the revolving speed of the driving wheels 116 and 118, that is, the revolving speed Nr of the ring gear shaft 126C, or the rate of change of the revolving speed Nr. When the remaining charge BRM of the battery 194 is less than the threshold value Bref, the continuous braking control routine of the second embodiment stops the operation of the engine 150. As discussed previously, however, the revolving speed Ne of the engine 150 may be set equal to a predetermined value. This structure enables the engine 150 to output the required energy quickly in response to the step-on of the accelerator pedal 164.

As discussed above, the power output apparatus 110C of the second embodiment enables the braking torque Tr* or the continuous braking torque Tr2* to be output to the ring gear shaft 126C by means of the first motor MG1 and the engine 150 or by means of the first motor MG1, the second motor MG2, and the engine 150. Another possible structure outputs part of the braking torque Tr* or the continuous braking torque Tr2* to the ring gear shaft 126C by means of a mechanical friction brake while outputting the residual torque by means of the first motor MG1, the second motor MG2, and the engine 150.

Figure 35:
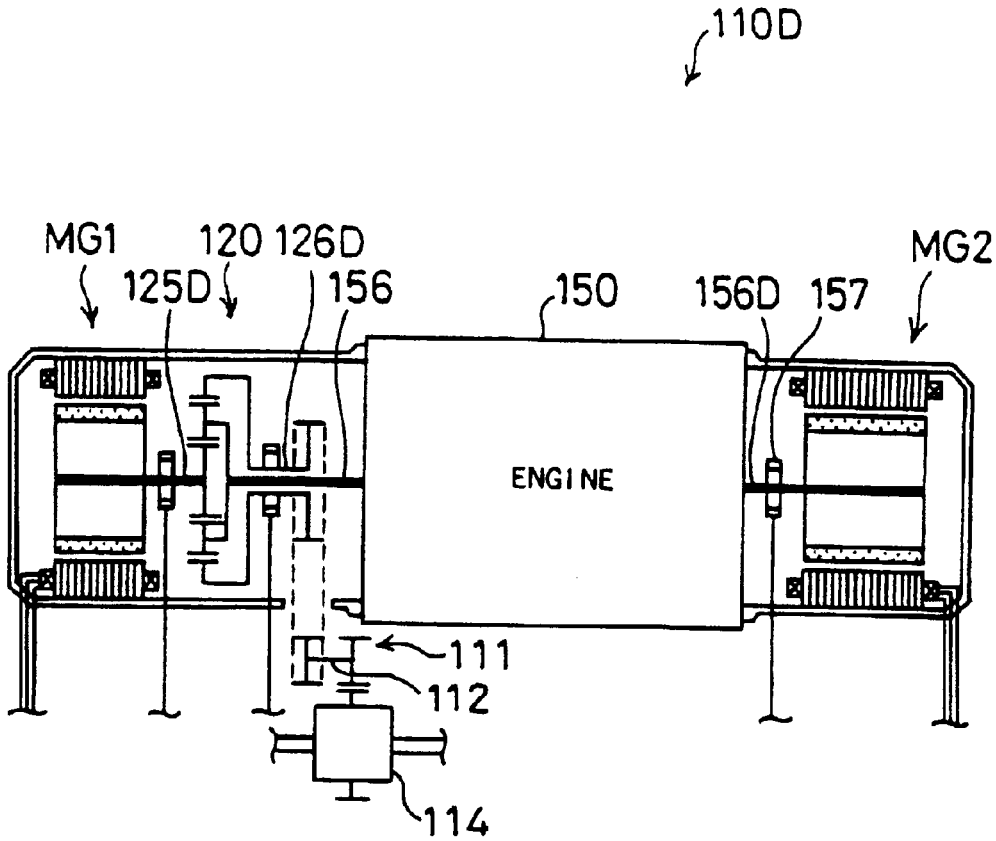
FIG. 35 schematically illustrates another power output apparatus 110D as a modified example of the second embodiment.
Figure 36:
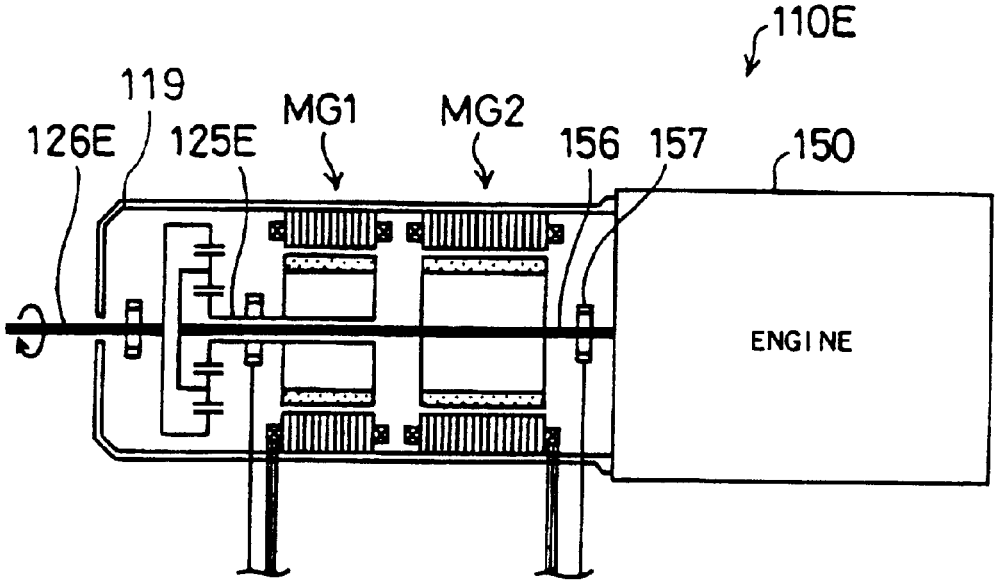
FIG. 36 schematically illustrates still another power output apparatus 110E as another modified example of the second embodiment.

In the power output apparatus 110C of the second embodiment, the second motor MG2 is interposed between the engine 150 and the first motor MG1. Like another power output apparatus 110D given as a modified example in FIG. 35, however, the engine 150 may be interposed between the first motor MG1 and the second motor MG2. In the power output apparatus 110C of the second embodiment, the power output to the ring gear shaft 126C is taken out of the arrangement between the first motor MG1 and the second motor MG2 via the power feed gear 128 linked with the ring gear 122. Like still another power output apparatus 110E shown in FIG. 36 as another modified example, however, the power may be taken out of the casing 119, from which a ring gear shaft 126E is extended.

In the power output apparatus 110 of the first embodiment, the power output apparatus 110C of the second embodiment, and their modified examples, the crankshaft 156 is linked with the planetary carrier 124 of the planetary gear 120, whereas the sun gear shaft 125 is linked with the first motor MG1 and the ring gear shaft 126 is linked with the power transmission gear 111, which connects with the drive shaft 112 via the power fed gear 128. The crankshaft 156, the first motor MG1, and the power transmission gear 111 may, however, be linked with the three shafts of the planetary gear 120 in any desired combination. In any case, the input and output powers, that is, the respective torque command values in each torque control procedure, can be readily obtained from the nomograms.

The present invention is not restricted to the above embodiments or its modified examples, but there may be many modifications, changes, and alterations without departing from the scope or spirit of the main characteristics of the present invention.

Figure 37:
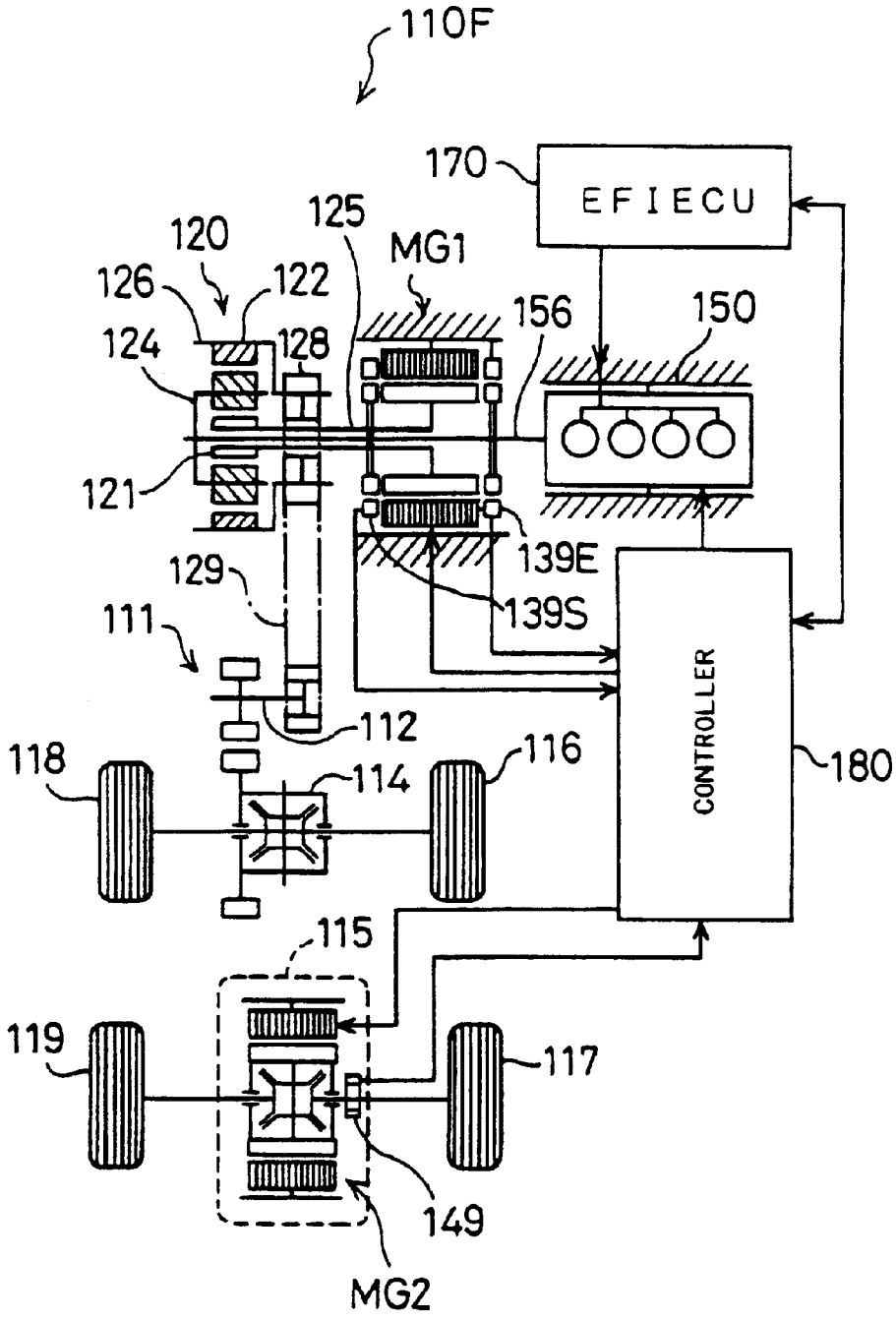
FIG. 37 schematically illustrates structure of a four-wheel-drive vehicle with a power output apparatus 110F; which is equivalent to the power output apparatus 110 of the first embodiment.

The power output apparatus 110 of the first embodiment and its modified examples discussed above are applied to the FR-type or FF-type two-wheel-drive vehicle. In another modified example of FIG. 37, however, a power output apparatus 110F is applied to a four-wheel-drive vehicle. In this structure, the second motor MG2 is separated from the ring gear shaft 126 and independently arranged in the rear-wheel portion of the vehicle, so as to drive the rear driving wheels 117 and 119. The ring gear shaft 126 is, on the other hand, connected to the differential gear 114 via the power feed gear 128 and the power transmission gear 111, in order to drive the four driving wheels 116 and 118. The torque control procedures of the first embodiment are also applicable to this structure.

Although the gasoline engine is used as the engine 150 in the power output apparatus 110 of the first embodiment and the power output apparatus 110C of the second embodiment, the principles of the invention is also applicable to other internal combustion engines and external combustion engines, such as Diesel engines, turbine engines, and jet engines.

In the power output apparatus 110 of the first embodiment and the power output apparatus 110C of the second embodiment, the planetary gear 120 is used as the three shaft-type power input/output means. Another available example is a double-pinion planetary gear having plural sets of planetary pinion gears. One planetary pinion gear in each pair is linked with the sun gear while the other is linked with the ring gear, and the pair of planetary pinion gears are linked with each other to revolve around the sun gear while rotating on its axis. Any other device or gear unit, such as a differential gear, is also applicable for the three shaft-type power input/output means, as long as it can determine powers input to and output from the residual one shaft based on predetermined powers input to and output from any two shafts among the three shafts.

Permanent mange (PM)-type synchronous motors are used as the first motor MG1 and the second motor MG2 in the first and the second embodiments discussed above. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the first and the second driving circuits 191 and 192 in the power output apparatus 110 of the first embodiment and the power output apparatus 110C of the second embodiment. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 194 in the above embodiments may include Pb cells, NiMH cells, Li cells, or the like cells. A capacitor may be used in place of the battery 194.

Although the power output apparatus is mounted on the vehicle in all the above embodiments, it may be mounted on other transportation means like ships and airplanes as well as a variety of industrial machines.

It should be clearly understood that the above embodiments are only illustrative and not restrictive in any sense. The scope and spirit of the present invention are limited only by the terms of the appended claims.

What is claimed is:

[1. A power output apparatus for outputting power to a drive shaft, said power output apparatus comprising:

an engine having an output shaft;

a motor having a rotating shaft and inputting and outputting power to and from said rotating shaft;

three shaft-type power input/output means having three shafts respectively linking said engine and said drive shaft, said three shaft-type power input/output means inputting and outputting power to and from a residual one shaft, based on predetermined powers input to and output from any two shafts among said three shafts;

storage battery means for supplying and receiving an electrical energy required for inputting and outputting power to and from said motor; and braking control means for controlling said engine and said motor, based on a changing state of said storage battery means, in order to enable a braking force to be applied to said drive shaft.]

[2. A power output apparatus in accordance with claim 1, wherein said braking control means comprises means for enabling said motor to carry out a regenerative operation, thereby applying a braking force to said drive shaft.]

[3. A power output apparatus in accordance with claim 1, wherein said braking control means comprises means for enabling said motor to carry out a power operation, thereby applying a braking force to said drive shaft.]

[4. A power output apparatus in accordance with claim 1, wherein said braking control means comprises means for controlling said motor, in order to enable said motor to motor said engine.]

[5. A power output apparatus in accordance with claim 1, wherein said braking control means comprises means for locking up said motor.]

[6. A power output apparatus in accordance with claim 1, said power output apparatus further comprising:

a second motor for inputting and outputting power to and from said drive shaft, in addition to said motor working as a first motor, wherein said storage battery means comprises means for supplying and receiving an electrical energy required for inputting and outputting power to and from said second motor, said braking control means comprising means for controlling said engine, said first motor, and said second motor, in order to enable a braking force to be applied to said drive shaft.]

7. A power output apparatus [in accordance with claim 6] *for outputting power to and from said rotating shaft*, said power output apparatus [further] comprising:

*an engine having an output shaft;*

*a motor having a rotating shaft and inputting and outputting power to and from said rotating shaft;*

*three shaft-type power input/output means having three shafts, including the output shaft and the rotating shaft, respectively linking said engine and said drive shaft, said three shaft-type power input/output means inputting and outputting power to and from a residual one shaft, based on predetermined powers input to and output from any two shafts among said three shafts;*

*storage battery means for supplying and receiving an electrical energy required for inputting and outputting to and from said motor;* [and]

*braking control means for controlling said engine and said motor, based on a charging state of said storage battery means, in order to enable a braking force to be applied to said drive shaft;*

*a second motor for inputting and outputting power to and from said drive shaft, in addition to said motor working as a first motor; and* charging state detection means for detecting the charging state of said storage battery means,

*wherein said storage battery means comprises means for supplying and receiving an electrical energy required for inputting and outputting power to and from said second motor,*

*said braking control means comprising means for controlling said engine, said first motor, and said second motor, in order to enable a braking force to be applied to said drive shaft*

[wherein said braking control means comprises means for controlling said engine, said first motor, and said second motor] based on the charging state of said storage battery means detected by said charging state detection means, thereby applying a braking force to said drive shaft.

8. A power output apparatus [in accordance with claim 7, wherein said braking control means comprises] *for outputting power to a drive shaft, said power output apparatus comprising:*

*an engine having an output shaft;*

*a motor having a rotating shaft and inputting and outputting power to and from said rotating shaft;*

*three shaft-type power input/output means having three shafts respectively linking said engine and said drive shaft, said three shaft-type power input/output means inputting and outputting power to and from a residual one shaft, based on predetermined powers input to and output from any two shafts among said three shafts;*

*storage battery means for supplying and receiving an electrical energy required for inputting and outputting power to and from said motor;*

*braking control means for controlling said engine and said motor, based on a charging state of said storage battery means, in order to enable a braking force to be applied to said drive shaft;*

*a second motor for inputting and outputting power to and from said drive shaft, in addition to said motor working as a first motor, wherein said storage battery means comprises means for supplying and receiving an electrical energy required for inputting and outputting power to and from said second motor; and*

*charging state detection means for detecting the charging state of said storage battery means, wherein said braking control means comprises means for controlling said engine, said first motor, and said second motor based on the charging state of said storage battery means detected by said charging state detection means, thereby applying a braking force to said drive shaft, and* means for regulating the charging state of said storage battery means detected by said charging state detection means to be within a predetermined range.

9. A power output apparatus [in accordance with claim 6, wherein said braking control means comprises] *for outputting power to a drive shaft, said power output apparatus comprising:*

*an engine having an output shaft;*

*a motor having a rotating shaft and inputting and outputting power to and from said rotating shaft;*

*three shaft-type power input/output means having three shafts respectively linking said engine and said drive*

*shaft, said three shaft-type power input/output means inputting and outputting power to and from a residual one shaft, based on predetermined powers input to and output from any two shafts among said three shafts;*

*storage battery means for supplying and receiving an electrical energy required for inputting and outputting power to and from said motor;*

*braking control means for controlling said engine and said motor, based on a charging state of said storage battery means, in order to enable a braking force to be applied to said drive shaft; and*

*a second motor for inputting and outputting power to and from said drive shaft, in addition to said motor working as a first motor, wherein said storage battery means comprises means for supplying and receiving an electrical energy required for inputting and outputting power to and from said second motor, and said braking control means comprises means for controlling said engine, said first motor, and said second motor, in order to enable a braking force to be applied to said drive shaft, and* means for controlling said second motor in order to enable said second motor to apply a braking force to said drive shaft, while controlling said first motor in order to make power input to and output from said first motor equal to zero.

[10. A power output apparatus in accordance with claim 6, wherein said braking control means comprises means for controlling said second motor in order to enable said second motor to apply a braking force to said drive shaft, while controlling said engine and said first motor in order to set a driving state of said engine to a predetermined operating condition.]

11. A power output apparatus [in accordance with claim 10,] *for outputting power to a drive shaft,* said power output apparatus [further] comprising:

*an engine having an output shaft;*

*a motor having a rotating shaft and inputting and outputting power to and from said rotating shaft;*

*three shaft-type power input/output means having three shafts, including the output shaft and the rotating shaft, respectively linking said engine and said drive shaft, said three shaft-type power input/output means inputting and outputting power to and from a residual one shaft, based on predetermined powers input to and output from any two shafts among said three shafts;*

*storage battery means for supplying and receiving an electrical energy required for inputting and outputting power and from said motor;* [and]

*braking control means for controlling said engine and said motor, based on a charging state of said storage battery means, in order to enable a braking force to be applied to said drive shaft;*

*a second motor for inputting and outputting power to and from said drive shaft, in addition to said motor working as a first motor;* driving state detection means for detecting a driving state of said drive shaft; and braking-time driving state setting means for setting [the redetermined] *a predetermined* operating condition based on the driving state of said drive shaft detected by said driving state detection means,

*wherein said storage battery means comprises means for supplying and receiving an electrical energy required for inputting and outputting power to and from said second motor,*

*said braking control means comprising means for controlling said engine, said first motor, and said second motor, in order to enable a braking force to be applied to said drive shaft, such that said second motor is enabled to apply a braking force to said drive shaft, while controlling said engine and said first motor in order to set a driving state of said engine to the predetermined operating condition.*

[12. A power output apparatus in accordance with claim 10, wherein the driving state of said engine represents a revolving speed of said output shaft of said engine.]

[13. A power output apparatus in accordance with claim 6, wherein said braking control means comprises means for controlling said first motor, in order to enable said first motor to motor said engine.]

14. A power output apparatus [in accordance with claim 6, wherein said braking control means comprises] *for outputting power to a drive shaft, said power output apparatus comprising:*

*an engine having an output shaft;*

*a motor having a rotating shaft and inputting and outputting power to and from said rotating shaft;*

*three shaft-type power input/output means having three shafts respectively linking said engine and said drive shaft, said three shaft-type power input/output means inputting and outputting power to and from a residual one shaft, based on predetermined powers input to and output from any two shafts among said three shafts;*

*storage battery means for supplying and receiving an electrical energy required for inputting and outputting power to and from said motor;*

*braking control means for controlling said engine and said motor, based on a charging state of said storage battery means, in order to enable a braking force to be applied to said drive shaft; and*

*a second motor for inputting and outputting power to and from said drive shaft, in addition to said motor working as a first motor, wherein said storage battery means comprises means for supplying and receiving an electrical energy required for inputting and outputting power to and from said second motor, and said braking control means comprises means for controlling said engine, said first motor, and said second motor, in order to enable a braking force to be applied to said drive shaft, and* means for controlling said first motor and said second motor, in order to enable an electrical energy regenerated by said second motor to be identical with an electrical energy consumed by said first motor.

[15. A power output apparatus in accordance with claim 1, said power output apparatus further comprising:

a second motor for inputting and outputting power to and from said output shaft of said engine, in addition to said motor working as a first motor, wherein said storage battery means comprises means for supplying and receiving an electrical energy required for inputting and outputting power to and from said second motor, said braking control means comprising means for controlling said engine, said first motor, and said second motor, in order to enable a braking force to be applied to said drive shaft.]

16. A power output apparatus [in accordance with claim 15], *for outputting power to a drive shaft*, said power output apparatus [further] comprising:

*an engine having an output shaft;*

*a motor having a rotating shaft and inputting and outputting power to and from said rotating shaft;*

*three shaft-type power input/output means having three shafts, including the output shaft and the rotating shaft,*

*respectively linking said engine and said drive shaft, said three shaft-type power input/output means inputting and outputting power to and from a residual one shaft, based on predetermined powers input to and output from any two shafts among said three shafts;*

*storage battery means for supplying and receiving an electrical energy required for inputting and outputting power to and from said motor;* [and]

*braking control means for controlling said engine and said motor, based on a charging state of said storage battery means, in order to enable a braking force to be applied to said drive shaft;*

*a second motor for inputting and outputting power to and from said output shaft of said engine, in addition to said motor working as a first motor; and* charging state detection means for detecting the charging state of said storage battery means,

*wherein said storage battery means comprises means for supplying and receiving an electrical energy required for inputting and outputting power to and from said second motor,*

[wherein said braking control means comprises means for controlling said engine, said first motor, and said second motor] *said braking control means comprising means for controlling said engine, said first motor, and said second motor, in order to enable a braking force to be applied to said drive shaft* based on the charging state of said storage battery means detected by said charging state detection means.

17. A power output apparatus [in accordance with claim 16, wherein said braking control means comprises] *for outputting power to a drive shaft, said power output apparatus comprising:*

*an engine having an output shaft;*

*a motor having a rotating shaft and inputting and outputting power to and from said rotating shaft;*

*three shaft-type power input/output means having three shafts respectively linking said engine and said drive shaft, said three shaft-type power input/output means inputting and outputting power to and from a residual one shaft, based on predetermined powers input to and output from any two shafts among said three shafts;*

*storage battery means for supplying and receiving an electrical energy required for inputting and outputting power to and from said motor;*

*braking control means for controlling said engine and said motor, based on a charging state of said storage battery means, in order to enable a braking force to be applied to said drive shaft;*

*a second motor for inputting and outputting power to and from said output shaft of said engine, in addition to said motor working as a first motor, wherein said storage battery means comprises means for supplying and receiving an electrical energy required for inputting and outputting power to and from said second motor;*

*charging state detection means for detecting the charging state of said storage battery means, wherein said braking control means comprises means for controlling said engine, said first motor, and said second motor in order to enable a braking force to be applied to said drive shaft based on the charging state of said storage battery means detected by said charging state detection means, and* means for regulating the charging state of said storage battery means detected by said charging state detection means to be within a predetermined range.

[18. A power output apparatus in accordance with claim 15, wherein said braking control means comprises means for controlling said first motor in order to enable said first motor to motor said engine, while controlling said second motor in order to enable said second motor to apply a braking force to said output shaft of said engine.]

19. A power output apparatus [in accordance with claim 15, wherein said braking control means comprises] *for outputting power to a drive shaft, said power output apparatus comprising:*

*an engine having an output shaft;*

*a motor having a rotating shaft and inputting and outputting power to and from said rotating shaft;*

*three shaft-type power input/output means having three shafts respectively linking said engine and said drive shaft, said three shaft-type power input/output means inputting and outputting power to and from a residual one shaft, based on predetermined powers input to and output from any two shafts among said three shafts;*

*storage battery means for supplying and receiving an electrical energy required for inputting and outputting power to and from said motor;*

*braking control means for controlling said engine and said motor, based on a charging state of said storage battery means, in order to enable a braking force to be applied to said drive shaft; and*

*a second motor for inputting and outputting power to and from said output shaft of said engine, in addition to said motor working as a first motor, wherein said storage battery means comprises means for supplying and receiving an electrical energy required for inputting and outputting power to and from said second motor, and said braking control means comprises means for controlling said engine, said first motor, and*

*said second motor, in order to enable a braking force to be applied to said drive shaft, and* means for controlling said first motor and said second motor, in order to enable an electrical energy regenerated by said second motor to be identical with an electrical energy consumed by said first motor.

[20. A method of controlling a power output apparatus for outputting power to a drive shaft, said method comprising the steps of:

(a) providing (1) an engine having an output shaft; (2) a first motor having a rotating shaft and inputting and outputting power to and from said rotating shaft; (3) a second motor for inputting and outputting power to and from said drive shaft; and (4) three shaft-type power input/output means having three shafts respectively linking said engine and said drive shaft, said three shaft-type power input/output means inputting and outputting power to and from a residual one shaft, based on predetermined powers input to and output from any two shafts among said three shafts;

(b) controlling said second motor, in order to enable said second motor to apply a braking force to said drive shaft; and (c) controlling said engine and said first motor, in order to set a driving state of said engine to a predetermined operating condition.]

21. A method of controlling a power output apparatus for outputting power to a drive shaft, said method comprising the steps of:

(a) providing (1) an engine having an output shaft; (2) a first motor having a rotating shaft and inputting and outputting power to and from said rotating shaft; (3) a second motor for inputting and outputting power to and from said drive shaft; (4) three shaft-type power input/output means having three shafts respectively linking said engine and said drive shaft, said three shaft-type power input/output means inputting and outputting power to and from a residual one shaft, based on predetermined powers input to and output from any two shafts among said three shafts; and (5) storage battery means for supplying and receiving an electrical energy required for inputting and outputting power to and from said first motor, and supplying and receiving an electrical energy required for inputting and outputting power to and from said second motor; and (b) controlling said engine, said first motor, and said second motor, in order to apply a braking force to said drive shaft while keeping a charging state of said storage battery means within a predetermined range.

*22. A method of controlling a power output apparatus, for outputting power to a drive shaft, having an engine with an output shaft, a motor with a rotating shaft, and three shaft-type power input/output means having three shafts respectively linking said engine and said drive shaft, a second motor, the method comprising:*

*inputting and outputting power to and from said rotating shaft;*

*inputting and outputting power, via said three shaft-type power input/output means, to and from a residual one shaft, based on predetermined powers input to and output from any two shafts among said three shafts;*

*supplying and receiving an electrical energy, from a storage battery means, required for inputting and outputting power to and from said motor;*

*controlling, using a braking control means, said engine and said motor, based on a charging state of said storage battery means, in order to enable a braking force to be applied to said drive shaft;*

*inputting and outputting power to and from said drive shaft via the second motor, in addition to said motor working as a first motor;*

*supplying and receiving an electrical energy, from said battery storage means, required for inputting and outputting power to and from said second motor;*

*detecting the charging state of said storage battery means;*

*controlling, via said braking control means, said engine, said first motor, and said second motor based on the detected charging state of said storage battery means, to thereby apply a braking force to said drive shaft; and*

*regulating the charging state of said storage battery means to be within a predetermined range.*

*23. A method of controlling a power output apparatus, for outputting power to a drive shaft, having an engine with an output shaft, a motor with a rotating shaft, a second motor, and three shaft-type power input/output means having three shafts respectively linking said engine and said drive shaft, said method comprising:*

*inputting and outputting power to and from said rotating shaft;*

*inputting and outputting power, via said three shaft-type power input/output means, to and from a residual one shaft, based on predetermined powers input to and output from any two shafts among said three shafts;*

*supplying and receiving an electrical energy, from a storage battery means, required for inputting and outputting power to and from said motor;*

*controlling, using a braking control means, said engine and said motor, based on a charging state of said storage battery means, in order to enable a braking force to be applied to said drive shaft;*

*inputting and outputting power, from a second motor, to and from said output shaft of said engine, in addition to said motor working as first motor;*

*supplying and receiving an electrical energy, from said storage battery means, required for inputting and outputting power to and from said second motor;*

*controlling said engine, said first motor, and said second motor, using the braking control means, in order to enable a braking force to be applied to said drive shaft;*

*detecting a charging state of said storage battery means using a charging state detection means, wherein controlling said engine, said first motor, and said second motor is based on the charging state of said storage battery means detected by said charging state detection means; and*

*regulating the charging state of said storage battery means detected by said charging state detection means to be within a predetermined range.*

* * * * *